(12) United States Patent
Olson et al.

(10) Patent No.: US 10,546,603 B2
(45) Date of Patent: Jan. 28, 2020

(54) MAGNETIC WRITE HEAD FOR PROVIDING SPIN-TORQUE-ASSISTED WRITE FIELD ENHANCEMENT

(71) Applicant: Western Digital Technologies, Inc., San Jose, CA (US)

(72) Inventors: James Terrence Olson, Santa Cruz, CA (US); Hiroyuki Hoshiya, Odawara (JP); Alexander Goncharov, Morgan Hill, CA (US); Masato Shiimoto, Fujisawa (JP); Mikito Sugiyama, Odawara (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/440,922

(22) Filed: Jun. 13, 2019

(65) Prior Publication Data

US 2019/0295572 A1  Sep. 26, 2019

Related U.S. Application Data

(63) Continuation of application No. 15/659,767, filed on Jul. 26, 2017, now Pat. No. 10,366,714, which is a (Continued)

(51) Int. Cl.
*G11B 5/39* (2006.01)
*G11B 5/00* (2006.01)

(52) U.S. Cl.
CPC ......... *G11B 5/3929* (2013.01); *G11B 5/3912* (2013.01); *G11B 2005/0024* (2013.01)

(58) Field of Classification Search
CPC ............... G11B 5/3929; G11B 5/3912; G11B 2005/0024
See application file for complete search history.

(56) References Cited

U.S. PATENT DOCUMENTS 6,201,653 B1  3/2001  Contreras et al.
6,614,554 B1  9/2003  Yokoi
(Continued)

FOREIGN PATENT DOCUMENTS

CN  104835510 B  11/2017
JP  2013047999 A  3/2013
(Continued)

OTHER PUBLICATIONS

Center for Memory and Recording Research, "Research Review & Advisory Council Meeting Program," Oct. 8-9, 2015.
(Continued)

*Primary Examiner* — Brian E Miller
(74) *Attorney, Agent, or Firm* — Jacobsen IP Law

(57) ABSTRACT

Disclosed herein are magnetic write heads and hard disk drives comprising such magnetic write heads. A magnetic head comprises a magnetic pole, a first shield separated from the magnetic pole at an air-bearing surface (ABS) of the magnetic head, a magnetic layer disposed between the magnetic pole and the first shield, wherein the magnetic layer comprises at least of iron, cobalt, or nickel, a first non-magnetic layer disposed between the magnetic pole and the magnetic layer, and a second non-magnetic layer disposed between the magnetic layer and the first shield, wherein the magnetic layer is the only magnetic layer at the ABS that is between the main pole and the first shield that is not adjacent to the main pole or the first shield.

20 Claims, 15 Drawing Sheets

Related U.S. Application Data continuation of application No. 15/140,761, filed on Apr. 28, 2016, now abandoned.

(56) References Cited

U.S. PATENT DOCUMENTS

| | | | |
|---|---|---|---|
| 6,813,115 B2 | 11/2004 | Van der Heijden et al. | |
| 7,310,197 B2 | 12/2007 | Baumgart et al. | |
| 7,397,633 B2 | 7/2008 | Xue et al. | |
| 7,538,977 B2 | 5/2009 | Gider et al. | |
| 7,724,469 B2 | 5/2010 | Gao et al. | |
| 7,869,160 B1 | 1/2011 | Pan et al. | |
| 7,982,996 B2 | 7/2011 | Smith et al. | |
| 8,049,984 B2 | 11/2011 | Contreras et al. | |
| 8,116,031 B2 | 2/2012 | Alex et al. | |
| 8,174,798 B2 | 5/2012 | Nagasawa et al. | |
| 8,179,633 B2 | 5/2012 | Contreras et al. | |
| 8,203,192 B2 | 6/2012 | Gao et al. | |
| 8,208,219 B2 | 6/2012 | Zhang et al. | |
| 8,238,059 B1 | 8/2012 | Tang et al. | |
| 8,274,811 B2 | 9/2012 | Zhang et al. | |
| 8,339,736 B2 | 12/2012 | Gao et al. | |
| 8,351,155 B2 | 1/2013 | Contreras et al. | |
| 8,400,734 B2 | 3/2013 | Yamada et al. | |
| 8,422,159 B2 | 4/2013 | Gao et al. | |
| 8,446,690 B2 | 5/2013 | Alex et al. | |
| 8,467,149 B2 | 6/2013 | Takeo et al. | |
| 8,472,135 B1 | 6/2013 | Kusukawa et al. | |
| 8,472,140 B2 | 6/2013 | Yamada et al. | |
| 8,537,497 B2 | 9/2013 | Nagasaka et al. | |
| 8,553,346 B2 | 10/2013 | Braganca et al. | |
| 8,564,903 B2 | 10/2013 | Min et al. | |
| 8,570,684 B1 | 10/2013 | Contreras et al. | |
| 8,582,240 B1 | 11/2013 | Chen et al. | |
| 8,599,506 B2 | 12/2013 | Contreras et al. | |
| 8,654,465 B2 | 2/2014 | Braganca et al. | |
| 8,654,480 B2* | 2/2014 | Shimizu | G11B 5/314 360/128 |
| 8,755,153 B2 | 6/2014 | Kudo et al. | |
| 8,797,693 B1 | 8/2014 | Furukawa et al. | |
| 8,824,104 B1 | 9/2014 | Koui et al. | |
| 8,879,205 B2 | 11/2014 | Shiimoto et al. | |
| 8,896,973 B2 | 11/2014 | Nagasawa et al. | |
| 8,917,465 B1 | 12/2014 | Contreras et al. | |
| 8,953,273 B1 | 2/2015 | Funayama | |
| 9,001,444 B1 | 4/2015 | Contreras et al. | |
| 9,007,722 B2 | 4/2015 | Shimizu et al. | |
| 9,007,723 B1 | 4/2015 | Igarashi et al. | |
| 9,042,051 B2 | 5/2015 | Zeng et al. | |
| 9,047,888 B2 | 6/2015 | Katada et al. | |
| 9,064,508 B1 | 6/2015 | Shiimoto et al. | |
| 9,099,128 B1 | 8/2015 | Contreras et al. | |
| 9,142,227 B1 | 9/2015 | Etoh et al. | |
| 9,202,528 B2 | 12/2015 | Furukawa et al. | |
| 9,230,569 B1 | 1/2016 | Shimoto et al. | |
| 9,230,571 B1 | 1/2016 | Chen et al. | |
| 9,275,672 B2 | 3/2016 | Shiroishi et al. | |
| 9,318,131 B2 | 4/2016 | Tian et al. | |
| 9,330,691 B1 | 5/2016 | Narita et al. | |
| 9,355,657 B1 | 5/2016 | Aoyama et al. | |
| 9,355,668 B2 | 5/2016 | Nishida et al. | |
| 9,368,135 B2 | 6/2016 | Gao | |
| 9,378,759 B2 | 6/2016 | Nagasaka et al. | |
| 9,390,734 B2 | 7/2016 | Gao | |
| 9,679,587 B2 | 6/2017 | Taguchi | |
| 9,881,637 B1 | 1/2018 | Wilson et al. | |
| 10,121,497 B1 | 11/2018 | Takahashi et al. | |
| 10,135,392 B2 | 11/2018 | Wei et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 2002/0130658 A1 | 9/2002 | Abe | |
| 2006/0067006 A1 | 3/2006 | Takagishi et al. | |
| 2007/0195453 A1 | 8/2007 | Kameda et al. | |
| 2008/0212239 A1 | 9/2008 | Kawato et al. | |
| 2008/0304176 A1 | 12/2008 | Takagishi et al. | |
| 2009/0059423 A1 | 3/2009 | Yamada et al. | |
| 2009/0080106 A1 | 3/2009 | Shimizu et al. | |
| 2009/0310244 A1 | 12/2009 | Shimazawa et al. | |
| 2010/0091623 A1 | 4/2010 | Tsuyama | |
| 2011/0134561 A1 | 6/2011 | Smith et al. | |
| 2011/0216435 A1 | 9/2011 | Shiimoto et al. | |
| 2011/0279921 A1 | 11/2011 | Zhang et al. | |
| 2011/0310510 A1 | 12/2011 | Anagawa et al. | |
| 2012/0002331 A1 | 1/2012 | Oikawa et al. | |
| 2012/0113542 A1 | 5/2012 | Igarashi et al. | |
| 2012/0224283 A1 | 9/2012 | Sato et al. | |
| 2012/0243127 A1 | 9/2012 | Iwasaki et al. | |
| 2012/0275061 A1 | 11/2012 | Takagishi et al. | |
| 2013/0235485 A1 | 9/2013 | Livshitz et al. | |
| 2013/0250456 A1 | 9/2013 | Yamada et al. | |
| 2013/0258514 A1 | 10/2013 | Kobayashi et al. | |
| 2014/0063648 A1 | 3/2014 | Shiroishi et al. | |
| 2014/0104724 A1* | 4/2014 | Shiroishi | G11B 5/66 360/75 |
| 2014/0139952 A1 | 5/2014 | Takeo et al. | |
| 2014/0146420 A1 | 5/2014 | Shimizu et al. | |
| 2014/0168824 A1 | 6/2014 | Ju et al. | |
| 2014/0177092 A1 | 6/2014 | Katada et al. | |
| 2014/0177100 A1 | 6/2014 | Sugiyama et al. | |
| 2014/0268428 A1 | 9/2014 | Dimitrov et al. | |
| 2014/0269235 A1 | 9/2014 | Gong et al. | |
| 2015/0002963 A1 | 1/2015 | Tian et al. | |
| 2015/0092292 A1 | 4/2015 | Furukawa et al. | |
| 2016/0027455 A1 | 1/2016 | Kudo et al. | |
| 2016/0027456 A1 | 1/2016 | Gao | |
| 2016/0035373 A1 | 2/2016 | Takagishi et al. | |
| 2016/0035375 A1 | 2/2016 | Gao | |
| 2016/0055866 A1 | 2/2016 | Le et al. | |
| 2016/0180906 A1 | 6/2016 | Kudo et al. | |
| 2017/0236537 A1 | 8/2017 | Murakami et al. | |
| 2018/0252780 A1 | 9/2018 | Iwasaki et al. | |
| 2018/0261241 A1 | 9/2018 | Narita et al. | |
| 2018/0268848 A1 | 9/2018 | Narita et al. | |
| 2019/0088274 A1 | 3/2019 | Narita et al. | |
| 2019/0088275 A1 | 3/2019 | Narita et al. | |

FOREIGN PATENT DOCUMENTS

| | | |
|---|---|---|
| JP | 2013251042 A | 12/2013 |
| JP | 2014130672 A | 7/2014 |
| JP | 2015011745 A | 1/2015 |
| JP | 2014081981 B | 2/2017 |
| JP | 2018146314 A | 9/2018 |
| JP | 2018147540 A | 9/2018 |
| JP | 2018158709 A | 10/2018 |
| WO | 2015126326 A1 | 8/2015 |

OTHER PUBLICATIONS

Mike Mallary, et al., "Head and Media Challenges for 3 Tb/in2 Microwave-Assisted Magnetic Recording," IEEE Transactions on Magnetics, vol. 5, Iss. 7, Jul. 2014.

Takuto Katayama, et al., "Micromagnetic model analysis of integrated single-pole-type head with tilted spin-torque oscillator for high-frequency microwave-assisted magnetic recording," J. Appl. Phys. 117, 17C503 (2015).

Yasushi Kanai, et al., "Micromagnetic Simulation of Spin-Torque Oscillator for Microwave-Assisted Magnetic Recording—Interaction Between Write Head and STO and Optimum Injected Current," IEEE Transactions on Magnetics, vol. 52, Issue 7, Jul. 2016.

* cited by examiner

MAGNETIC WRITE HEAD FOR PROVIDING SPIN-TORQUE-ASSISTED WRITE FIELD ENHANCEMENT

CROSS-REFERENCE TO RELATED APPLICATIONS

This application is a continuation of, and hereby incorporates by reference for all purposes the entirety of the contents of, U.S. patent application Ser. No. 15/659,767, filed Jul. 26, 2017 and entitled "MAGNETIC WRITE HEAD FOR PROVIDING SPIN-TORQUE-ASSISTED WRITE FIELD ENHANCEMENT", which is a continuation of U.S. patent application Ser. No. 15/140,761, filed Apr. 28, 2016 and entitled "MAGNETIC WRITE HEAD FOR PROVIDING SPIN-TORQUE-ASSISTED WRITE FIELD ENHANCEMENT", the entirety of which is also hereby incorporated by reference for all purposes.

BACKGROUND

Magnetic storage systems, such as hard disk drives, are used to store large amounts of information. A magnetic head in a magnetic storage system typically includes a read/write transducer for retrieving and storing magnetically encoded information on a magnetic recording medium, such as a disk.

The ability to increase the storage capacity in magnetic recording is an ongoing concern. As the amount of information to be stored on the magnetic recording medium continues to increase, demands for higher-density recording also continue to increase. High areal densities can be obtained in a perpendicular magnetic recording (PMR) system by increasing the linear density (i.e., the number of bits written in the down-track direction) and/or the track density (i.e., the widths of the tracks). Thus, written bits must become narrower (i.e., in the cross-track direction) and shorter (i.e., in the down-track direction).

Writing shorter bits requires a larger write field gradient. Ideally, the write field gradient is a step, that is, an infinite slope of the field gradient, at the dynamic coercivity of the recording medium being used to enable shorter bits to be written. One way to increase the write field gradient is to reduce the write gap, but doing so reduces the write field. Likewise, for conventional perpendicular magnetic recording, the need to increase track density requires the writer to be narrower, which reduces both the write field and the write field gradient.

Thus, recording bits that are both narrower and shorter raises a fundamental problem: narrower bits require a narrower writer, which reduces the write field magnitude and gradient, whereas the shorter bits require larger gradients and at least no degradation in field magnitude. This problem has led to various proposed alternative magnetic recording approaches and technologies, such as shingled magnetic recording (SMR) and heat-assisted magnetic recording (HAMR).

U.S. Pat. No. 7,538,977 proposes to place a diamagnetic material in the write gap. The primary disadvantage of this approach is the absence of readily-available materials that have sufficient performance at room temperatures. A superconductor may be needed.

Another proposed approach is microwave-assisted magnetic recording (MAMR). In MAMR systems, a spin-torque oscillator (STO) comprising a field-generation layer (FGL) and spin-polarization layer (SPL) is placed within in the write gap. The write head generates a write field that, beneath the main pole, is substantially perpendicular to the magnetic recording layer, and the STO generates a high-frequency auxiliary field to the recording layer. Ideally, the auxiliary field has a frequency close to the resonance frequency of the magnetic grains in the recording layer to facilitate the switching of the magnetization of the grains. As a consequence, the oscillating field of the STO's FGL resonates with the media and provides strong writing despite having a narrow writer.

Although the theory of MAMR is understood, in practice it may be difficult to fabricate a STO structure that has sufficiently stable oscillations at a frequency appropriate for a media, which generally has a narrow range of frequencies to which it responds. For example, in many cases, the FGL's frequency is too low to resonate with the media, or the FGL's frequency is within the proper range to resonate with the media, but the oscillations are unstable. Moreover, the SPL-plus-FGL structure of the STO may be difficult to build into high-gradient, but narrow, write gaps. In addition, the use of MAMR requires a joint optimization of both the writer and the media, which may be complicated, time-consuming, or expensive.

Thus, there is an ongoing need for a narrow, stable, more-easily-fabricated writer that provides adequate write field and gradient to enable high-density magnetic recording without requiring a joint optimization of the writer and media.

SUMMARY

Disclosed herein are writers with spin-torque-assisted write field enhancement that include a DC-field-generation (DFG) layer to enable high-density magnetic recording. A significant benefit of the disclosed writers is that they enable high-density magnetic recording without requiring resonance with the media. Consequently, there is no need to jointly optimize the writer and the media of the disk drive as there would be to achieve high performance with a MAMR writer.

Embodiments of two types of writers with spin-torque-assisted write field enhancement are disclosed: main-pole-integrated (MP-integrated) and trailing-shield-integrated (TS-integrated). MP-integrated embodiments include a DFG layer and use the main pole as the spin source. MP-integrated embodiments may be advantageous because the DFG layer is close to the main pole, which may provide more significant DC contributions to the writer field. Numerous exemplary embodiments of MP-integrated writers are disclosed herein. Each includes one magnetic layer, itself potentially comprising multiple magnetic layers, and at least two non-magnetic layers deposited in the write gap.

TS-integrated writer embodiments include a DFG layer and use the trailing shield as the spin source. TS-integrated embodiments may be advantageous because conventional seed layers may be grown on top of the main pole to connect to the DFG layer, thereby resulting in stable crystalline growth. Numerous exemplary embodiments of TS-integrated writers are disclosed herein. Like each of the disclosed MP-integrated writer embodiments, each disclosed TS-integrated writer embodiment includes one magnetic layer, potentially made of multiple magnetic layers, and at least two non-magnetic layers deposited in the write gap.

Embodiments of writers with spin-torque-assisted write field enhancement may circumvent the myriad problems of implementing MAMR while simultaneously providing increased performance relative to conventional PMR writers. Experimental and simulation data confirm that the writers disclosed herein may provide an approximate 5% areal density capacity gain for current writers and media.

Disclosed herein are magnetic write heads having writers with spin-torque-assisted write field enhancement and disk drives comprising such magnetic write heads. In some embodiments, a magnetic write head with spin-torque-assisted write field enhancement comprises, within a write gap at an air-bearing surface, a main pole, a trailing shield, a spacer, which may be non-magnetic, disposed between the main pole and the trailing shield, a non-magnetic layer disposed between the main pole and the trailing shield, and magnetic DC-field-generation (DFG) layer adjacent to the spacer and disposed between the spacer and the non-magnetic layer. In some embodiments, the DFG layer is the only magnetic layer within the write gap that is not adjacent to the main pole or the trailing shield. In some embodiments, a thickness of an effective write gap including the spacer, the non-magnetic layer, and the DFG layer is between about 14 nm and about 33 nm (measured in the direction perpendicular to the gap surfaces of the main pole and trailing shield), or, preferably, between about 20 nm and about 25 nm (also measured in the direction perpendicular to the gap surfaces of the main pole and trailing shield). In some embodiments, a product of a thickness of the DFG layer and a magnetic saturation flux density of the DFG layer is between about 3 nm×Tesla and about 9 nm×Tesla.

In some embodiments, a thickness of the spacer is between about 3 nm and about 5 nm, a thickness of the DFG layer is between about 3 nm and about 9 nm, and a thickness of the non-magnetic layer is between about 8 nm and about 19 nm.

In some embodiments, the spacer is non-magnetic. In some embodiments, the spacer comprises copper, silver, gold, or an alloy comprising copper, silver, or gold. In some embodiments, the spacer is adjacent to the main pole or adjacent to the trailing shield.

In some embodiments, the non-magnetic layer comprises at least one of nickel, chromium, aluminum, ruthenium, tantalum, or copper. In some embodiments, the non-magnetic layer comprises a nickel-aluminum alloy or a nickel-chromium alloy.

In some embodiments, the DFG layer comprises more than one layer. In some embodiments, the DFG layer comprises two layers. In other embodiments, the DFG layer comprises three layers.

In some embodiments in which the DFG layer comprises more than one layer, the DFG layer comprises a first layer comprising at least one of cobalt, iron, or a cobalt-iron alloy, wherein a thickness of the first layer is between about 0.2 nm and about 1 nm, and a second layer comprising an alloy of cobalt, a first element, and a second element, wherein the first element is manganese or iron, and the second element is germanium, aluminum, silicon, or gallium, and wherein a thickness of the second layer is between about 2 nm and about 8 nm. In some such embodiments, the DFG layer further comprises a third layer comprising at least one of cobalt, iron, or a cobalt-iron alloy, wherein a thickness of the third layer is between about 0.2 nm and about 1 nm.

In some embodiments in which the DFG layer comprises more than one layer, the DFG layer comprises a first layer comprising at least one of cobalt or a cobalt-iron alloy, wherein a thickness of the first layer is between about 0.2 nm and about 1 nm, and a second layer comprising at least one of nickel, iron, or a nickel-iron alloy, wherein a thickness of the second layer is between about 2 nm and about 8 nm.

In some embodiments, a magnetic saturation flux density of the DFG layer is between about 1 Tesla and about 1.5 Tesla.

In some embodiments, the magnetic write head further comprises a magnetic notch between the trailing shield and the main pole, wherein the trailing shield and the magnetic notch or the main pole and the magnetic notch are made of identical materials. In some embodiments having a magnetic notch, a thickness of the magnetic notch is between about 1 nm and about 10 nm.

In some embodiments, the magnetic write head further comprises a magnetic notch between the trailing shield and the spacer, or between the main pole and the spacer. In some such embodiments, the magnetic notch comprises at least one of cobalt or iron.

In some embodiments, a magnetic head comprises a magnetic pole, a first shield separated from the magnetic pole at an air-bearing surface (ABS) of the magnetic head, a magnetic layer disposed between the magnetic pole and the first shield, wherein the magnetic layer comprises at least one of iron, cobalt, or nickel, a first non-magnetic layer disposed between the magnetic pole and the magnetic layer, and a second non-magnetic layer disposed between the magnetic layer and the first shield, wherein the magnetic layer is the only magnetic layer at the ABS that is between the magnetic pole and the first shield and that is not adjacent to the magnetic pole or the first shield.

In some embodiments, at least one of the first non-magnetic layer or the second non-magnetic layer comprises nickel, chromium, aluminum, ruthenium, tantalum, or copper. In some embodiments, at least one of the first non-magnetic layer or the second non-magnetic layer comprises a nickel-aluminum alloy or a nickel-chromium alloy. In some embodiments, at least one of the first non-magnetic layer or the second non-magnetic layer comprises copper, silver, gold, an alloy comprising copper, an alloy comprising silver, or an alloy comprising gold.

In some embodiments, a current is conductable in a direction from the first non-magnetic layer toward the second non-magnetic layer via the magnetic layer, or in a direction from the second non-magnetic layer toward the first non-magnetic layer via the magnetic layer.

In some embodiments, the magnetic layer is a main pole, and the first shield is a trailing shield.

In some embodiments, a thickness of the magnetic layer at the ABS in a downtrack direction is between about 3 nm and about 9 nm. In some embodiments, a thickness of the first non-magnetic layer at the ABS in a downtrack direction is between about 3 nm and about 5 nm, and a thickness of the second non-magnetic layer at the ABS in the downtrack direction is between about 8 nm and about 19 nm. In some embodiments, a thickness of the second non-magnetic layer at the ABS in downtrack direction is between about 3 nm and about 5 nm, and a thickness of the first non-magnetic layer at the ABS in the downtrack direction is between about 8 nm and about 19 nm.

In some embodiments, a magnetization of the magnetic layer has a component in a reverse direction of a magnetic field generated from the magnetic pole when a current is caused to flow between the first non-magnetic layer and the second non-magnetic layer.

In some embodiments, a magnetization of the magnetic layer has a component in a reverse direction of a magnetic field generated from the magnetic pole when a current is caused to flow between the second non-magnetic layer and the first non-magnetic layer.

In some embodiments, the magnetic layer comprises at least a first layer and a second layer. In some embodiments in which the magnetic layer comprises at least a first layer and a second layer, the first layer comprises at least one of cobalt, iron, or a cobalt-iron alloy, wherein a thickness of the first layer is between about 0.2 nm and about 1 nm, and the second layer comprises an alloy of cobalt, a first element, and a second element, wherein the first element is manganese or iron, and the second element is germanium, aluminum, silicon, or gallium, and wherein a thickness of the second layer is between about 2 nm and about 8 nm. In some such embodiments, the magnetic layer further comprises a third layer comprising at least one of cobalt, iron, or a cobalt-iron alloy, wherein a thickness of the third layer is between about 0.2 nm and about 1 nm.

In some embodiments in which the magnetic layer comprises at least a first layer and a second layer, the first layer comprises at least one of cobalt or a cobalt-iron alloy, wherein a thickness of the first layer is between about 0.2 nm and about 1 nm, and the second layer comprises at least one of nickel, iron, or a nickel-iron alloy, wherein a thickness of the second layer is between about 2 nm and about 8 nm.

In some embodiments, a magnetic saturation flux density of the magnetic layer is between about 1 Tesla and about 1.5 Tesla.

In some embodiments, the magnetic head further comprises a magnetic notch adjacent to the first shield or the magnetic pole, wherein the first shield and the magnetic notch or the magnetic pole and the magnetic notch are made of identical materials, wherein a thickness of the magnetic notch is between about 1 nm and about 10 nm.

In some embodiments, the magnetic head further comprises a magnetic notch between the first shield and the second non-magnetic layer, or between the magnetic pole and the first non-magnetic layer, wherein the magnetic notch comprises at least one of cobalt or iron.

In some embodiments, a data storage device comprises a magnetic head as described above, a magnetic recording medium, and a circuit configured to apply a bias current to the magnetic head to cause the magnetic head to write to the magnetic recording medium.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 2B illustrates the portion of the prior-art write head when the STO is on.

DETAILED DESCRIPTION

The following description is made for the purpose of illustrating the general principles of the present disclosure and is not meant to limit the inventive concepts claimed herein. Furthermore, particular embodiments described herein may be used in combination with other described embodiments in various possible combinations and permutations.

Disclosed herein are embodiments of a writer with spin-torque-assisted write field enhancement. The disclosed writers include a DC-field-generation (DFG) layer. Unlike a writer that includes a STO in the write gap, the disclosed writers provide improvements without requiring resonance with the magnetic layers in the writer. Specifically, the DFG layer arranges its magnetic moment so that its DC component assists the write field. The frequency of the field generated by the DFG layer is large enough that the magnetic media does not respond, and therefore the DFG layer does not contribute to the write field in an AC sense, yet the DC component generated by the DFG layer provides a substantial gain in write field and gradient for a narrow writer. Moreover, the DFG layer is thinner than a conventional STO and may be more easily included in high-gradient narrow write gaps. In addition, the disclosed writers may be easier to fabricate and may have a more predictable performance than writers that include a STO.

Figure 1:
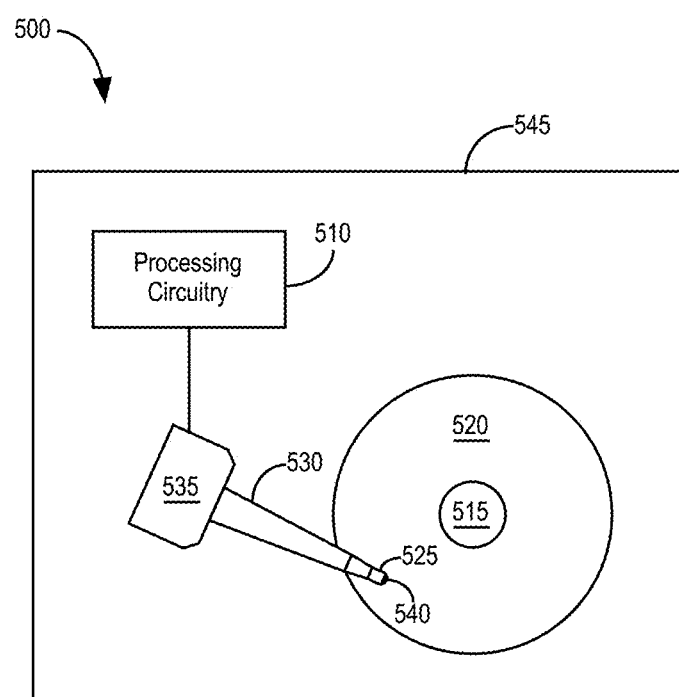
FIG. 1 illustrates several components of an exemplary hard disk drive in accordance with some embodiments.

An explanation of the components and operation of a hard disk drive sets the stage for a detailed explanation of the writer with spin-torque-assisted write field enhancement. FIG. 1 illustrates several components of an exemplary hard disk drive 500 in accordance with some embodiments. The magnetic hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, includes a combined read and write magnetic head 540. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, hard disk drive 500 may include a plurality (i.e., more than one) of disks 520, sliders 525, heads 540, and suspension and actuator arms 530.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520.

In operation, the actuator 535 moves the suspension and actuator arm 530 to position the slider 525 so that the magnetic head 540 is in a transducing relationship with the surface of the magnetic disk 520. The head 540 may be used to write information to one or more tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks.

For writing, the head 540 may use a single pole writer that has a main pole surrounded by magnetic shield materials. The main pole is typically separated from the magnetic shield materials by a non-magnetic spacer. The main pole may have a tapered shape with a tip that faces the magnetic recording medium and is part of the ABS. The single pole writer may include a conductive coil encircling the writer pole in a helical or pancake like configuration.

To write to the disk 520, the slider 525 passes over a region of the disk 520, and an electric current is applied through the coil of the head 540, which causes a large magnetic field to be generated from the main pole tip. The polarity of the generated field causes a region of the magnetic disk 520 to assume a polarity, thus enabling information to be stored on the disk 520.

To read information from the disk 520, the head 540 may include only one read sensor, or it may include multiple read sensors. The read sensor(s) in the head 540 may include, for example, one or more giant magnetoresistance (GMR) sensors, tunneling magnetoresistance (TMR) sensors, or another type of magnetoresistive sensor. When the slider 525 passes over a region of the disk 520, the head 540 detects changes in resistance due to magnetic field variations recorded on the disk 520, which represent the recorded bits.

Figure 2A:
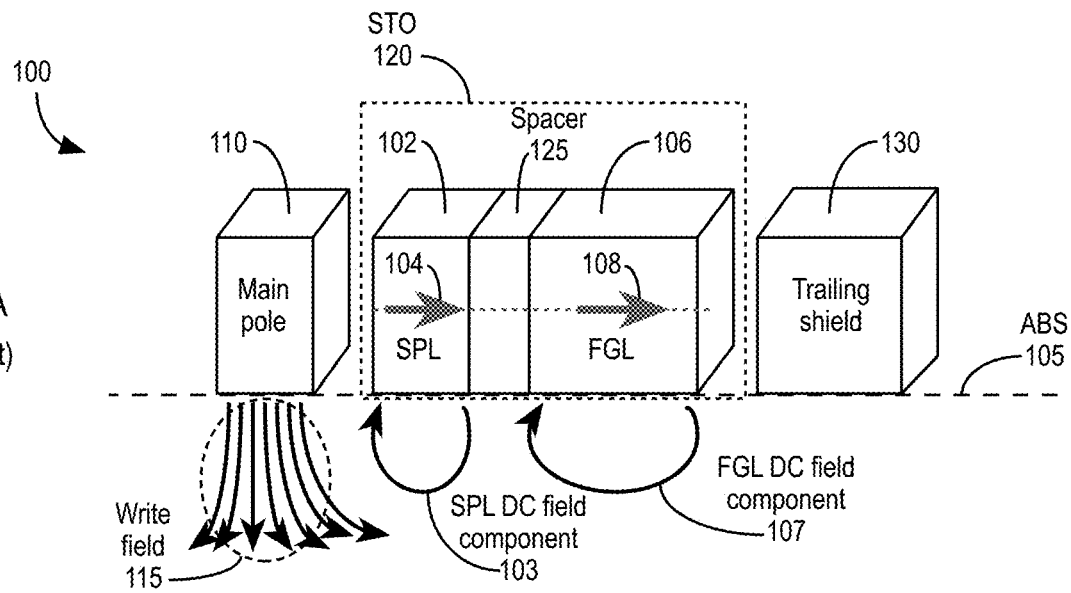
FIG. 2A illustrates a portion of a prior-art write head that includes a STO disposed between a main pole and a trailing shield. The STO is off, meaning that no bias current is applied.

FIG. 2A is a simplified illustration of a portion of a prior-art write head 100 that includes a STO 120 disposed between a main pole 110 and a trailing shield 130. The STO 120 includes a SPL 102, a spacer 125, and a FGL 106. As shown in FIG. 2A, a write field 115 emanates substantially perpendicular to the ABS 105 from the main pole 110. In FIG. 2A, the STO 120 is off, meaning that no bias current is applied. When the STO 120 is off, the magnetizations 104 and 108 of both the SPL 102 and the FGL 106, shown in FIG. 2A as arrows within the boxes representing the SPL 102 and the FGL 106, align with writer's gap field, thus producing a "negative DC effect." The effect is negative because, in the media, these fields oppose the writer field, making it weaker; the effect is "DC" because there is no magnetic oscillation to produce AC fields. Thus, even when the STO is off, the SPL 102 generates, in the magnetic media, a DC field component 103 that opposes the write field 115. Likewise, even when the STO is off, the FGL 106 generates, in the magnetic media, a DC field component 107 that also opposes the write field 115. Consequently, when the STO 120 is off, it decreases the write field 115 in the magnetic media, which indicates that the STO configuration imposes a handicap that must be overcome before the STO structure provides any benefit.

Figure 2B:
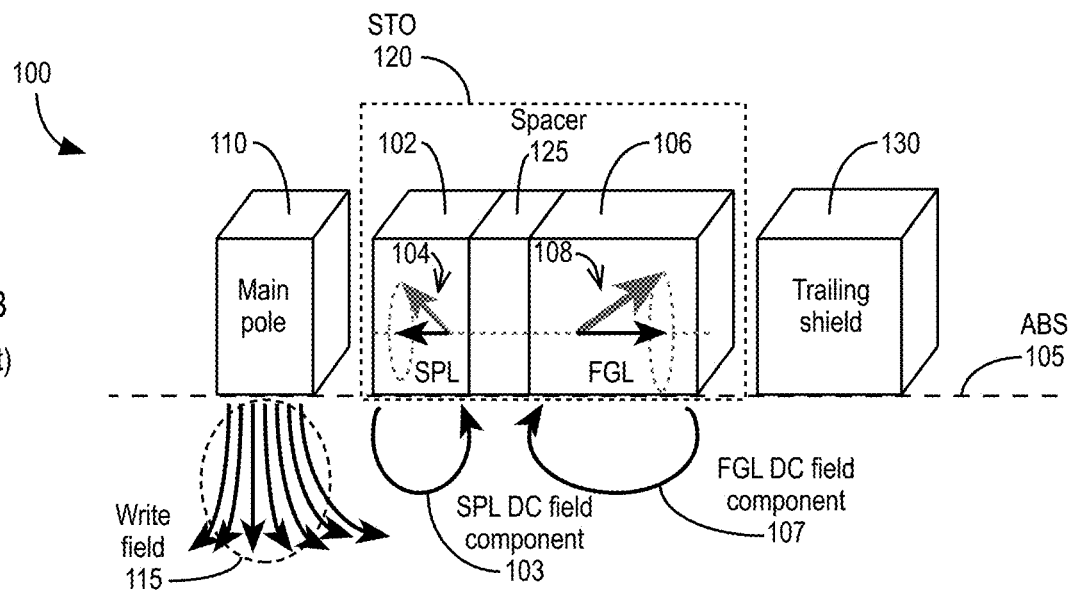

FIG. 2B illustrates the portion of the prior-art write head 100 when the STO 120 is on, meaning that sufficient bias current is applied. When the STO 120 is on, the magnetizations 104 and 108 of both the SPL 102 and the FGL 106 oscillate, with the frequency of the FGL magnetization 108 typically being much smaller than the frequency of the SPL magnetization 104. As shown in FIG. 2B, the FGL magnetization 108 precesses, which generates an elliptically polarized AC field that, ideally, resonates with the media. In addition, the down-track component of the FGL magnetization 108 is approximately constant, which causes a negative DC field component 107 that is weaker than when the STO 120 is off. The SPL magnetization 104 also precesses, but the frequency of the resulting AC field is too high to induce media resonance. The frequency of the SPL magnetization 104 is typically so much larger than the effective resonant frequency of the media that the media cannot respond to it. Consequently, the contribution of the SPL magnetization 104 is primarily DC. As the magnetizations 104 and 108 of the SPL 102 and the FGL 106 oscillate, the FGL magnetization 108 has a DC component that is aligned with the writer's gap field (not shown in FIG. 2B). As when the STO 120 is off, the FGL magnetization 108 causes a negative FGL DC field component 107 that reduces the write field 115 in the media. The DC component of the SPL magnetization 104, on the other hand, is aligned opposite to the gap field, causing a SPL DC field component 103 that is a "positive DC effect," which enhances the write field 115 in the media. Thus, the DC field components 103 and 107 of the SPL and FGL, respectively, compete against one another within the media layer.

Figure 3:
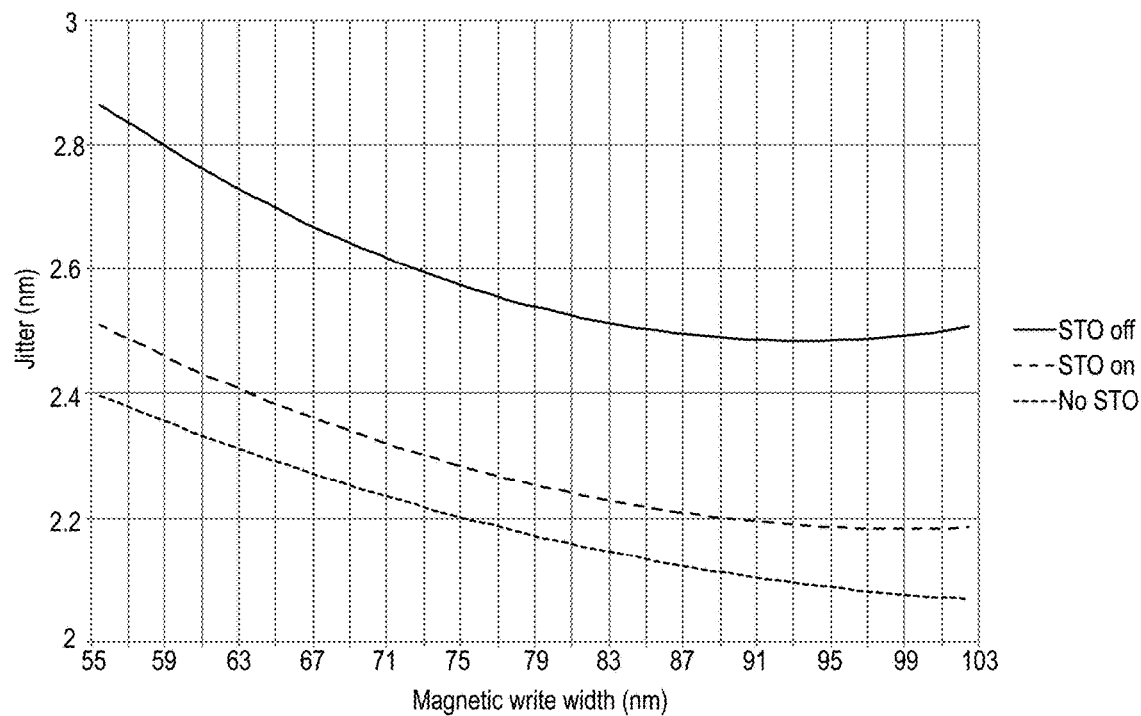
FIG. 3 illustrates three curves fit to spin-stand data to compare the performance of three write heads.

FIG. 3 illustrates three curves fit to spin-stand data to compare the jitter performance of three write heads. Jitter is a measure of the fluctuation of the media's recorded bit transition locations relative to their ideal noiseless positions. It is desirable to minimize jitter. The solid curve shown in FIG. 3 illustrates the jitter, in nm, as a function of magnetic write width, in nm, for a write head "A" that includes an STO 120 with no bias current applied (i.e., the STO 120 is situated in the write gap, but it is off). The long-dash curve illustrates the jitter as a function of magnetic write width for the same write head A with the STO 120 on (i.e., with an adequate bias current applied). The short-dash curve illustrates the jitter as a function of magnetic write width for a conventional write head "B" without an STO 120; note that the design of write head B is equivalent to replacing the STO of write head A with non-magnetic material. FIG. 3 indicates that the write head A with the STO 120 on provides lower jitter (and, therefore, better performance) than the write head A with the STO 120 off, but it does not perform as well as the write head B without any STO 120 at all. Thus, FIG. 3 illustrates the competition of the SPL and FGL DC field components 103 and 107 discussed in the context of FIG. 2B.

Figure 4:
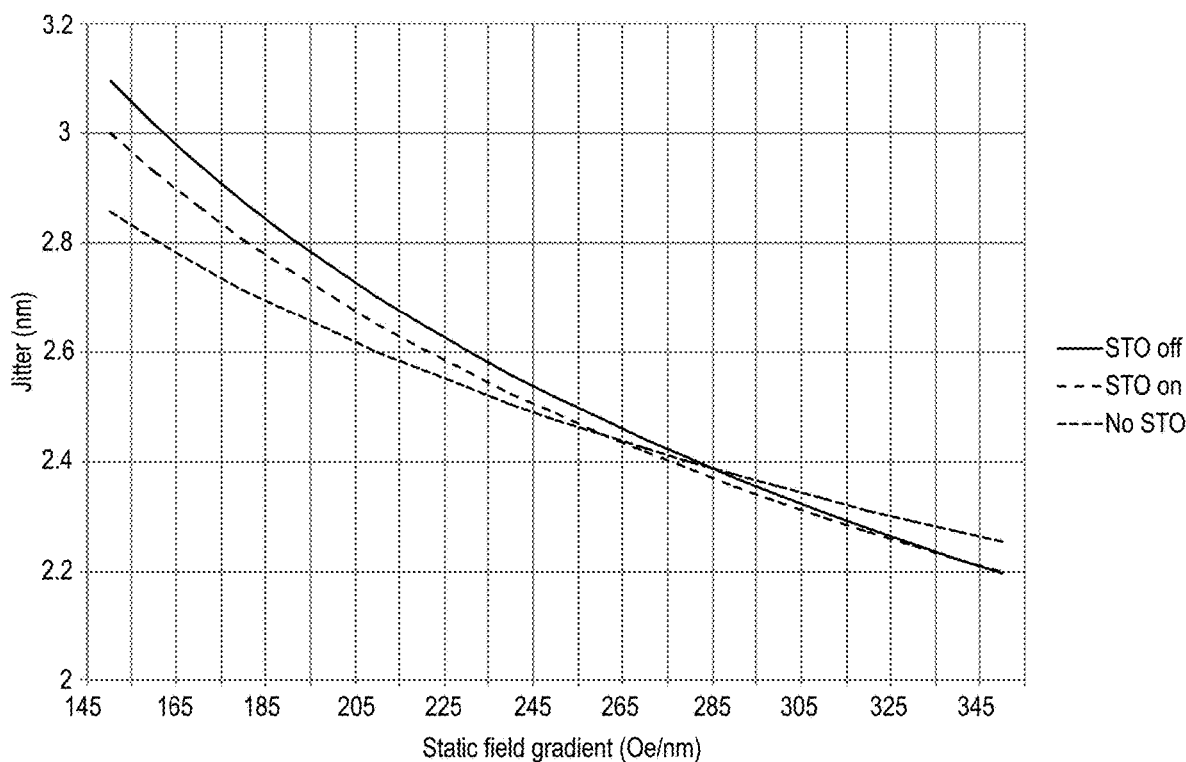
FIG. 4 plots the spin-stand data versus the modeled DC field gradient from two write heads, one having an STO, and the other having no STO.

FIG. 4 plots the spin-stand jitter versus the modeled DC field gradient from the write heads A and B described in the context of FIG. 3. FIG. 4 illustrates that the jitter performances of the write head A with the STO 120 on, the write head A with the STO 120 off, and the write head B without any STO 120 follow approximately the same curve with respect to the static field gradient. This result suggests that there is very little AC effect from the FGL 106, because DC modeling can roughly account for the observations. The inventors believe, based on STO characterization and modeling, that the FGL magnetization 108 oscillates too slowly to provide a significant AC effect. Based on this observation, and because, as shown in FIG. 3, the write head A with the STO 120 on performs almost as well as the write head B with no STO 120, the positive SPL DC component 103 has almost as much impact as the negative FGL DC component 107.

Based on these observations, the inventors conceived spin-torque-assisted write field enhancement using a DC-field-generating (DFG) layer in the write gap. The DFG layer produces a DC component that adds constructively to the write field 115 and thereby provides a larger field gradient and a larger write field magnitude, which results in smaller transition jitter and a larger low-frequency signal-to-noise ratio. Although a MAMR writer with a STO could produce a similar DC effect if the spin-torque were strong enough to orient the FGL magnetization 108 so that a significant FGL DC component 107 were aligned opposite the gap field, fabricating such a MAMR writer is difficult because it demands a SPL 102 with very high anisotropy (to prevent SPL precession) and polarization (to provide sufficient spin-torque). There are currently no good material candidates for such a device.

Figure 5A:
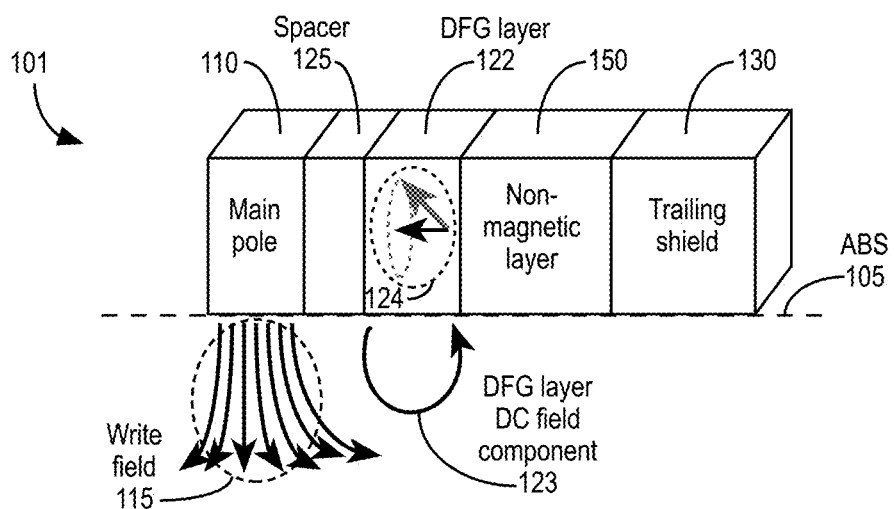
FIG. 5A illustrates a portion of a writer with spin-torque-assisted write field enhancement in accordance with some embodiments, referred to herein as "main-pole (MP) integrated" embodiments.

FIG. 5A is a simplified illustration of a portion of a writer 101 in accordance with some embodiments that are referred to herein as "main-pole-integrated" or "MP-integrated" embodiments. As shown in FIG. 5A, a write field 115 emanates substantially perpendicular to the ABS 105 from the main pole 110. A DFG layer 122, which is magnetic, is included in the write gap between the main pole 110 and the trailing shield 130. In the exemplary embodiment of FIG. 5A, a spacer 125, which is non-magnetic, is adjacent to the main pole 110, which is the spin source for the DFG layer 122, and the DFG layer 122 is adjacent to the spacer 125. In some embodiments, an optional magnetic notch (not shown) may be interposed between the main pole 110 and the spacer 125. A non-magnetic layer 150 is adjacent to the DFG layer 122 and the trailing shield 130. FIG. 5A illustrates the DFG layer magnetization 124, which results in the DFG layer DC field component 123 generated in the media when a sufficient bias current is applied to the writer 101. The DFG layer DC field component 123 is in the same direction as the write field 115 in the media and therefore adds constructively to the write field 115. Note that the frequency at which the AC component of the DFG layer magnetization 124 oscillates is substantially higher than the effective resonant frequency of the media, and therefore the media cannot respond to it. Consequently, the contribution of the DFG layer magnetization 124 is primarily DC.

Figure 5B:
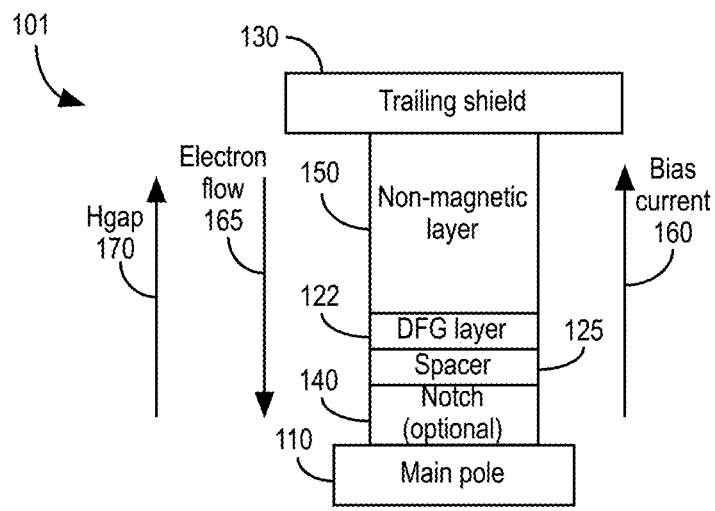
FIG. 5B is a view of the air-bearing surface (ABS) of the writer shown in FIG. 5A with the optional magnetic notch added between the spacer and the main pole.

FIG. 5B is a view of the ABS 105 of the writer 101 shown in FIG. 5A with the optional magnetic notch 140 added between the spacer 125 and the main pole 110. The purpose of the magnetic notch 140 is twofold. First, the magnetic notch 140 provides the spin-torque necessary to align the DC component of the DFG layer magnetization 124 opposite to Hgap 170 without undesired loss of spin current arising from potential interfacial imperfections and discontinuities due to depositing the spacer 125 directly on the main pole 110. Second, the magnetic notch 140 improves crystalline growth of the spacer 125 and the DFG layer 122 by acting as a seed layer deposited on the surface of the main pole 110, while keeping a suitable separation between the main pole 110 and trailing shield 130. As illustrated in FIG. 5B, the bias current 160 flows in the direction from the main pole 110 to the trailing shield 130; by the definition of current, the electron flow 165 is in the opposite direction. Note that the direction of Hgap 170 will reverse if the write coil's excitation changes polarity (e.g., if the writer 101 is writing an "up" bit instead of a "down" bit, or vice versa), with the magnetic orientation of the DFG layer 122 being opposite as well, such that the DC component of the DFG layer magnetization 124 still opposes Hgap 170.

If present, in MP-integrated embodiments the magnetic notch 140 may be made of the same material as the main pole 110. For example, both the main pole 110 and the magnetic notch 140 may comprise iron-cobalt. In some embodiments, the magnetic notch 140, if present, comprises at least one of cobalt or iron. In some embodiments, the thickness of the magnetic notch 140 is between about 1 nm and about 10 nm. FIGS. 8A through 8J provide examples of MP-integrated embodiments that include the optional magnetic notch 140.

Figure 6A:
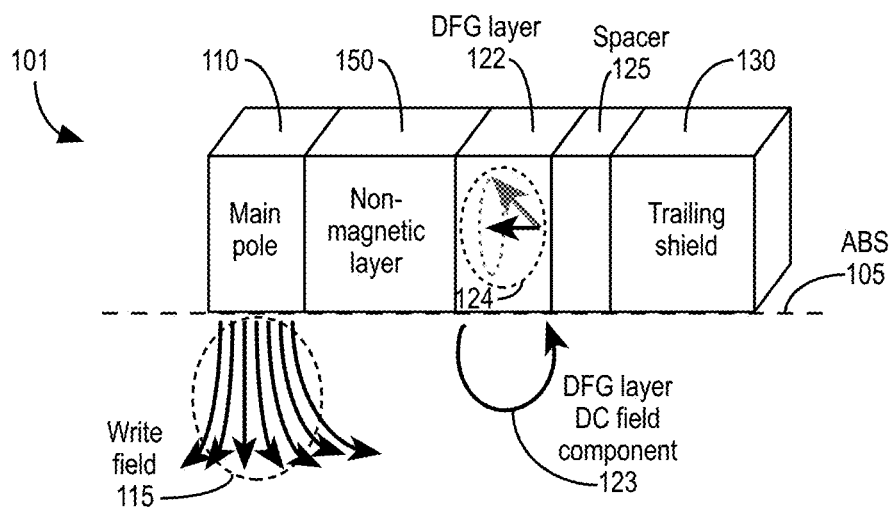
FIG. 6A illustrates a portion of a writer with spin-torque-assisted write field enhancement in accordance with other embodiments, referred to herein as "trailing-shield (TS) integrated" embodiments.

FIG. 6A is a simplified illustration of a portion of a writer 101 in accordance with other embodiments, referred to herein as "trailing shield (TS) integrated" embodiments. As shown in FIG. 6A, a write field 115 emanates substantially perpendicular to the ABS 105 from the main pole 110. In this case, however, the non-magnetic layer 150 is disposed between the main pole 110 and the DFG layer 122. The spacer 125 is adjacent to the DFG layer 122 and disposed between the DFG layer 122 and the trailing shield 130. As in the exemplary MP-integrated embodiment shown in FIGS. 5A and 5B, an optional notch (not shown in FIG. 6A) may be included between the spacer 125 and the trailing shield 130 in TS-integrated embodiments. In the TS-integrated embodiment of FIG. 6A, the trailing shield 130 is the spin source for the DFG layer 122. FIG. 6A illustrates the DFG layer magnetization 124, which results in the DFG layer DC field component 123 generated in the media when a sufficient bias current is applied to the writer 101. Within the media, the DFG layer DC field component 123 is in the same direction as the write field 115 and therefore adds constructively to the write field 115. As in the MP-integrated embodiments, the frequency at which the AC component of the DFG layer magnetization 124 oscillates is substantially higher than the effective resonant frequency of the media, and the contribution of the DFG layer magnetization 124 is primarily DC.

Figure 6B:
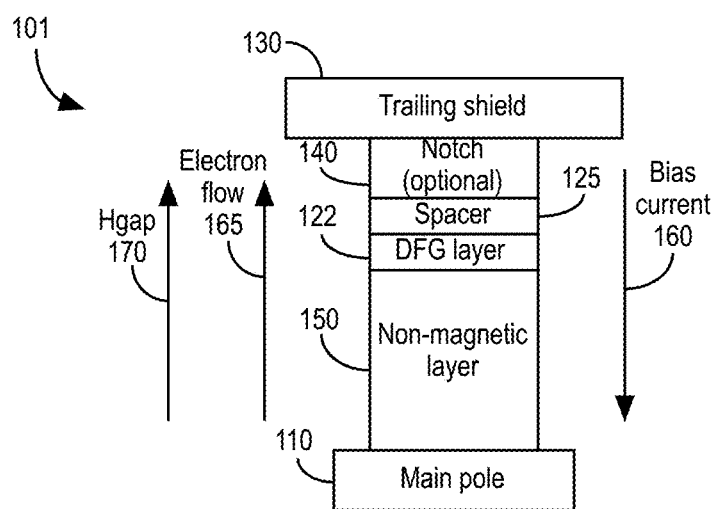
FIG. 6B is a view of the ABS of the writer shown in FIG. 6A with an optional magnetic notch added between the spacer and the main pole.

FIG. 6B is a view of the ABS 105 of the writer 101 shown in FIG. 6A with an optional magnetic notch 140 added between the spacer 125 and the trailing shield 130. The purpose of the magnetic notch 140 is as stated previously, namely to provide the spin-torque necessary to align the DFG layer DC magnetization component opposite to Hgap 170 without undesired loss of spin current, and to improve crystalline growth of the spacer 125 and the DFG layer 122. As illustrated in FIG. 6B, the bias current 160 flows in the direction from the trailing shield 130 to the main pole 110; thus, as explained previously, the electron flow 165 is in the opposite direction. As explained above, the direction of Hgap 170 will be opposite if the write coil's excitation changes polarity, with the magnetic orientation of the DFG layer 122 being opposite as well, such that the DC magnetization component still opposes Hgap 170.

If present, in TS-integrated embodiments the magnetic notch 140 may be made of the same material as the trailing shield 130. For example, both the trailing shield 130 and the magnetic notch 140 may comprise iron-cobalt. In some embodiments, the magnetic notch 140, if present, comprises at least one of cobalt or iron. In some embodiments, the thickness of the magnetic notch 140 is between about 1 nm and about 10 nm. FIGS. 9A through 9F provide examples of TS-integrated embodiments that include the optional magnetic notch 140.

Figure 7:
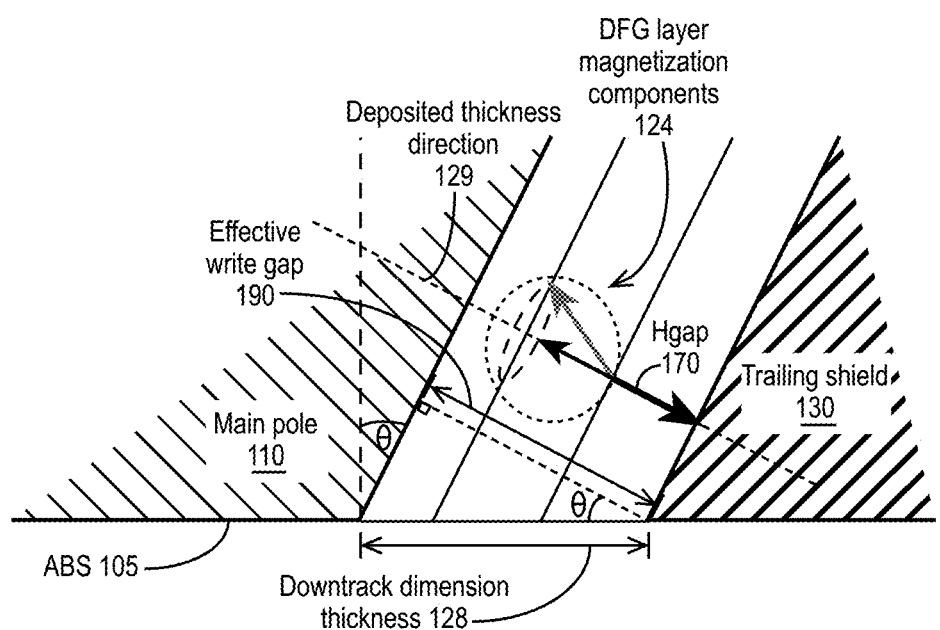
FIG. 7 illustrates certain dimensions of a write head having a trailing edge taper geometry in accordance with some embodiments.

In both MP-integrated embodiments and TS-integrated embodiments, the thickness of the effective write gap 190, which includes the spacer 125, the non-magnetic layer 150, and the DFG layer 122, may be between about 15 nm and about 25 nm. Preferably, the thickness of the effective write gap 190 is between about 20 nm and about 25 nm. Note that these measurements are perpendicular to the gap surfaces of the main pole 110 and trailing shield 130. As illustrated in FIG. 7, if the main pole 110 and trailing shield 130 gap surfaces are not perpendicular to the ABS, but instead are slanted or tapered at some angle θ, then the thickness of the effective write gap 190 along the ABS 105, labeled as the downtrack dimension thickness 128 in FIG. 7, is larger by a factor of 1/cos(θ) than the thickness of the effective write gap 190, which is in the deposited thickness direction 129. As an example, if the main pole 110 and trailing shield 130 are tapered at an angle of 25 degrees, the thickness of the effective write gap 190 along the ABS 105 (i.e., the downtrack dimension thickness 128) will be the thickness of the effective write gap 190 (i.e., the thickness in the deposited thickness direction 129) multiplied by a factor of 1/cos(25 degrees), or approximately 1.1. Note that, for simplicity, some of the drawings herein (e.g., FIGS. 5A and 6A) show the taper angle θ as zero, although the embodiments and claims are not so limited.

In both MP-integrated embodiments and TS-integrated embodiments, the spacer 125 may comprise, for example, copper, silver, gold, or an alloy of copper, silver, or gold. In some embodiments, the thickness of the spacer 125 is between about 3 nm and about 5 nm. The spacer 125 operates as an exchange-breaking layer, maintaining good polarization at an interface adjacent to the main pole 110 or trailing shield 130 without substantially degrading spin-polarized current.

In both MP-integrated embodiments and TS-integrated embodiments, the non-magnetic layer 150 may comprise, for example, one or more of nickel, chromium, aluminum, ruthenium, tantalum, or copper. The non-magnetic layer 150 may comprise, for example, a nickel-aluminum alloy or a nickel-chromium alloy. In some embodiments, the thickness of the non-magnetic layer 150 is between about 8 nm and about 19 nm. The non-magnetic layer 150 may be only a single layer, or it may comprise multiple layers.

Figure 8A:
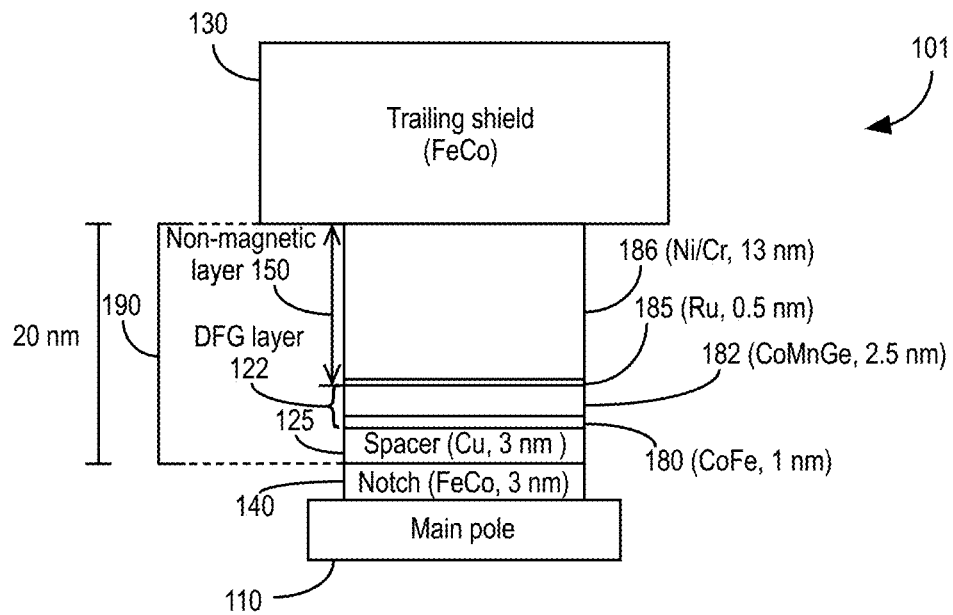
FIG. 8A is a view of the ABS of an exemplary MP-integrated writer in accordance with some embodiments.

In both MP-integrated embodiments and TS-integrated embodiments, the DFG layer 122 may be a single layer or may comprise multiple layers. For example, in some embodiments, the DFG layer 122 comprises a first layer comprising at least one of cobalt, iron, or a cobalt-iron alloy, and a thicker second layer comprising a cobalt alloy denoted as CoXM, where X is, for example, manganese or iron, and M is, for example, germanium, aluminum, silicon, or gallium. In some such embodiments, the first layer is between about 0.2 nm and about 1 nm thick, and the second layer is between about 2 nm and about 8 nm thick. FIGS. 8A and 8D, discussed below, illustrate exemplary embodiments in which the DFG layer 122 comprises a first layer comprising CoFe and a second layer comprising CoMnGe.

In some embodiments, the DFG layer 122 comprises a first layer comprising at least one of cobalt, iron, or a cobalt-iron alloy; a thicker second layer comprising a cobalt alloy denoted as CoXM, where X is, for example, manganese or iron, and M is, for example, germanium, aluminum, silicon, or gallium; and a third layer comprising at least one of cobalt, iron, or a cobalt-iron alloy. In some such embodiments, the first layer is between about 0.2 nm and about 1 nm thick, the second layer is between about 2 nm and about 8 nm thick, and the third layer is between about 0.2 nm and about 1 nm thick. FIGS. 9A and 9D-9F, discussed below, illustrate exemplary embodiments in which the DFG layer 122 comprises a first layer comprising CoFe, a second layer comprising CoMnGe, and a third layer comprising CoFe.

In some embodiments, the DFG layer 122 comprises a first layer comprising at least one of cobalt or a cobalt-iron alloy, and a second layer comprising at least one of nickel, iron, or a nickel-iron alloy. In some such embodiments, the thickness of the first layer is between about 0.2 nm and about 1 nm, and the thickness of the second layer is between about 2 nm and about 8 nm. FIGS. 8B, 8C, 8E through 8J, 9B, and 9C, discussed below, illustrate exemplary embodiments in which the DFG layer 122 comprises a first layer comprising cobalt and a second layer comprising NiFe.

In some embodiments, the thickness of the DFG layer 122, whether comprising a single layer or multiple layers, is between about 3 nm and about 9 nm.

In some embodiments, whether MP-integrated or TS-integrated, the DFG layer 122 comprises CoFe, NiFe, or a Heusler alloy. As would be appreciated by a person having ordinary skill in the art, a Heusler alloy is a ferromagnetic metal alloy based on a Heusler phase. Heusler phases are alloys (or, more generally, solid-state compounds exhibiting metallic bonding, defined stoichiometry, and ordered crystal structure) having a particular composition and face-centered cubic crystal structure. Heusler phases are ferromagnetic because of the double-exchange mechanism between neighboring magnetic ions, which are typically manganese ions that sit at the body centers of the cubic structure and carry most of the magnetic moment of the alloy.

In either a MP-integrated configuration or a TS-integrated configuration, a magnetic saturation flux density of the DFG layer 122 may be between about 1 Tesla and 1.5 Tesla.

One advantage of the exemplary embodiments illustrated in FIGS. 5A and 5B, and of MP-integrated embodiments in general, may be that because the DFG layer 122 is close to the main pole 110, the DFG layer DC component 123 may provide a stronger boost to the write field 115 than in TS-integrated embodiments in which the DFG layer 122 is further away from the main pole 110. On the other hand, one advantage of the exemplary embodiments illustrated in FIGS. 6A and 6B, and of TS-integrated embodiments in general, may be that the DFG layer 122 can be grown on a conventional seed layer, namely the non-magnetic layer 150, which may promote stable crystal growth, whereas in MP-integrated embodiments, the spacer 125 is grown on either the main pole 110 or the optional notch 140, which may be more challenging.

FIG. 8A is a view of the ABS 105 of an exemplary MP-integrated writer 101 in accordance with some embodiments. Like the MP-integrated writer 101 shown in FIG. 5B, the exemplary writer 101 illustrated in FIG. 8A includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}Co_{30}$.

In the exemplary embodiment illustrated in FIG. 8A, the spacer 125, which is disposed between and adjacent to the magnetic notch 140 and the DFG layer 122, comprises copper and is approximately 3 nm thick.

The DFG layer 122, which is disposed between and adjacent to the spacer 125 and a non-magnetic layer 150, comprises a first layer 180 comprising CoFe and a second layer 182 comprising CoMnGe. For example, the first layer 180 may comprise $Co_{50}Fe_{50}$, and the second layer 182 may comprise $Co_{53}Mn_{23}Ge_{24}$. In the embodiment shown in FIG. 8A, the first layer 180, which abuts the spacer 125, is about 1 nm thick, and the second layer 182, which abuts the non-magnetic layer 150, is about 2.5 nm thick.

The non-magnetic layer 150 comprises two layers, 185 and 186, in the exemplary embodiment of FIG. 8A and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 13 nm thick.

The trailing shield 130, which abuts the non-magnetic layer 150, comprises FeCo. In some embodiments, the trailing shield 130 comprises $Fe_{70}Co_{30}$.

The effective write gap 190, which comprises the spacer 125, the DFG layer 122, and the non-magnetic layer 150, is approximately 20 nm thick in the exemplary embodiment illustrated in FIG. 8A.

Figure 8B:
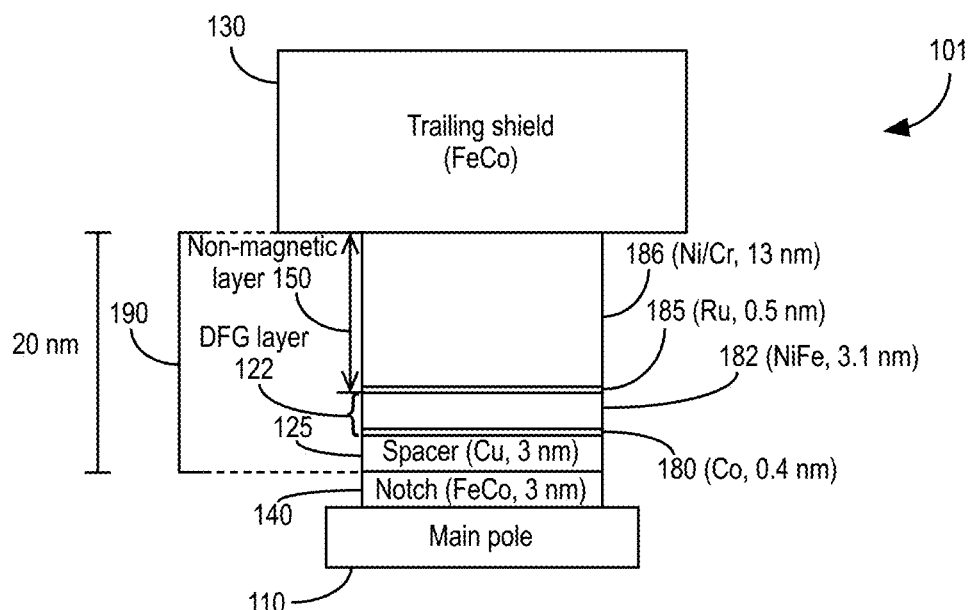
FIG. 8B is a view of the ABS of another exemplary MP-integrated writer in accordance with some embodiments.

FIG. 8B is a view of the ABS 105 of another exemplary MP-integrated writer 101 in accordance with some embodiments. Like the exemplary embodiment shown in FIG. 8A, the exemplary writer 101 illustrated in FIG. 8B includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8B, the first layer 180, which abuts the spacer 125, is about 0.4 nm thick, and the second layer 182, which abuts the non-magnetic layer 150, is about 3.1 nm thick. Thus, the thickness of the DFG layer 122 of the exemplary writer 101 shown in FIG. 8B is approximately 3.5 nm, which is the same as the thickness of the DFG layer 122 of the exemplary writer shown in FIG. 8A, but the materials in and thicknesses of the first and second layers 180, 182 differ between the two exemplary embodiments of FIGS. 8A and 8B.

The non-magnetic layer 150 comprises two layers, 185 and 186, in the exemplary embodiment of FIG. 8B and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 13 nm thick.

The trailing shield 130, which abuts the non-magnetic layer 150, comprises FeCo. For example, the trailing shield 130 may comprise $Fe_{70}Co_{30}$.

As in FIG. 8A, the effective write gap 190 of the exemplary embodiment illustrated in FIG. 8B, which comprises the spacer 125, the DFG layer 122, and the non-magnetic layer 150, is approximately 20 nm thick.

Figure 8C:
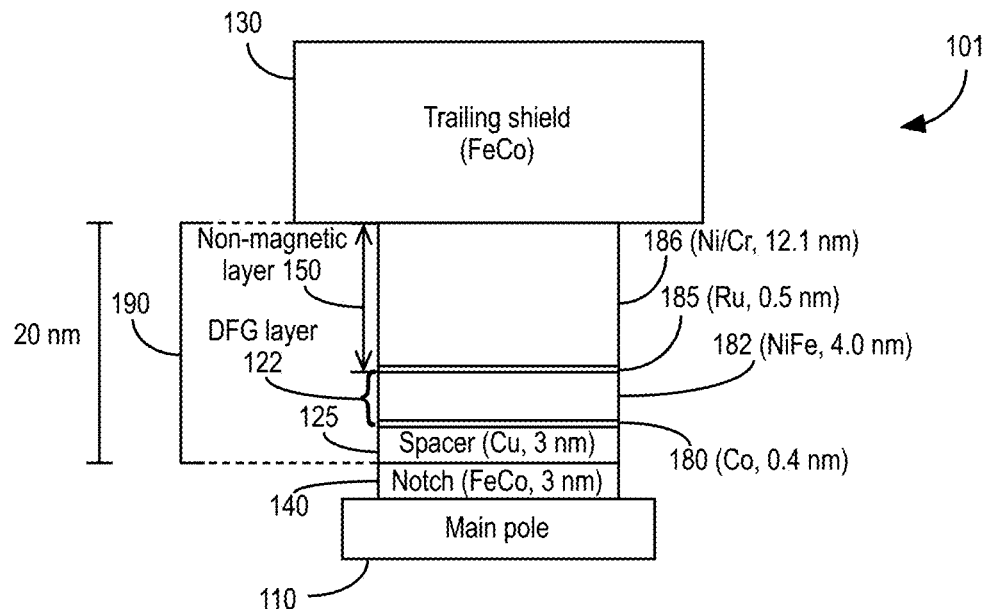
FIG. 8C is a view of the ABS of another exemplary MP-integrated writer in accordance with some embodiments.
Figure 8D:
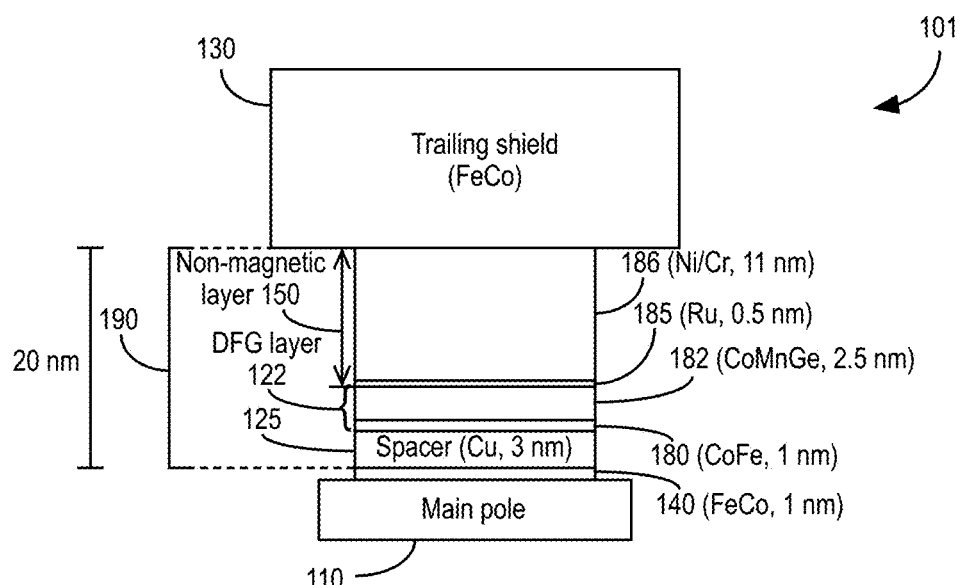
FIG. 8D is a view of the ABS of another exemplary MP-integrated writer in accordance with some embodiments.

FIG. 8C is a view of the ABS 105 of another exemplary MP-integrated writer 101 in accordance with some embodiments. Like the exemplary embodiments shown in FIGS. 8A and 8B, the exemplary writer 101 illustrated in FIG. 8C includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8C, the first layer 180, which abuts the spacer 125, is about 0.4 nm thick, and the second layer 182, which abuts the non-magnetic layer 150, is about 4 nm thick. Thus, the DFG layer 122 of the exemplary writer 101 shown in FIG. 8C is approximately 4.4 nm, which is thicker than the DFG layers 122 in the exemplary embodiments illustrated in FIGS. 8A and 8B.

The non-magnetic layer 150 comprises two layers, 185 and 186, in the exemplary embodiment shown in FIG. 8C and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 12.1 nm thick.

The trailing shield 130, which abuts the non-magnetic layer 150, comprises FeCo. For example, the trailing shield 130 may comprise $Fe_{70}Co_{30}$.

As in the embodiments illustrated in FIGS. 8A and 8B, the effective write gap 190 of the exemplary embodiment illustrated in FIG. 8C, which comprises the spacer 125, the DFG layer 122, and the non-magnetic layer 150, is approximately 20 nm thick.

FIG. 8D is a view of the ABS 105 of another exemplary MP-integrated writer 101 in accordance with some embodiments. Like the exemplary embodiments shown in FIGS. 8A through 8C, the exemplary writer 101 illustrated in FIG. 8D includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo, but in this case the magnetic notch 140 is thinner than in the embodiments shown in FIGS. 8A through 8C at approximately 1 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising CoFe and a second layer 182 comprising CoMnGe. For example, the first layer 180 may comprise $Co_{50}Fe_{50}$, and the second layer 182 may comprise $Co_{53}Mn_{23}Ge_{24}$. In the embodiment shown in FIG. 8D, the first layer 180, which abuts the spacer 125, is about 1 nm thick, and the second layer 182, which abuts the non-magnetic layer 150, is about 2.5 nm thick. Thus, the DFG layer 122 of FIG. 8D is identical to the DFG layer 122 of FIG. 8A, but it is closer to the main pole 110 than the DFG layer 122 of FIG. 8A because the magnetic notch 140 is thinner in the exemplary embodiment illustrated in FIG. 8D.

The non-magnetic layer 150 comprises two layers, 185 and 186, in the exemplary embodiment illustrated in FIG. 8D and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 11 nm thick.

The trailing shield 130, which abuts the non-magnetic layer 150, comprises FeCo. For example, the trailing shield 130 may comprise $Fe_{70}Co_{30}$.

As in the embodiments illustrated in FIGS. 8A through 8C, the effective write gap 190 of the exemplary embodiment illustrated in FIG. 8D, which comprises the spacer 125, the DFG layer 122, and the non-magnetic layer 150, is approximately 20 nm thick.

Figure 8E:
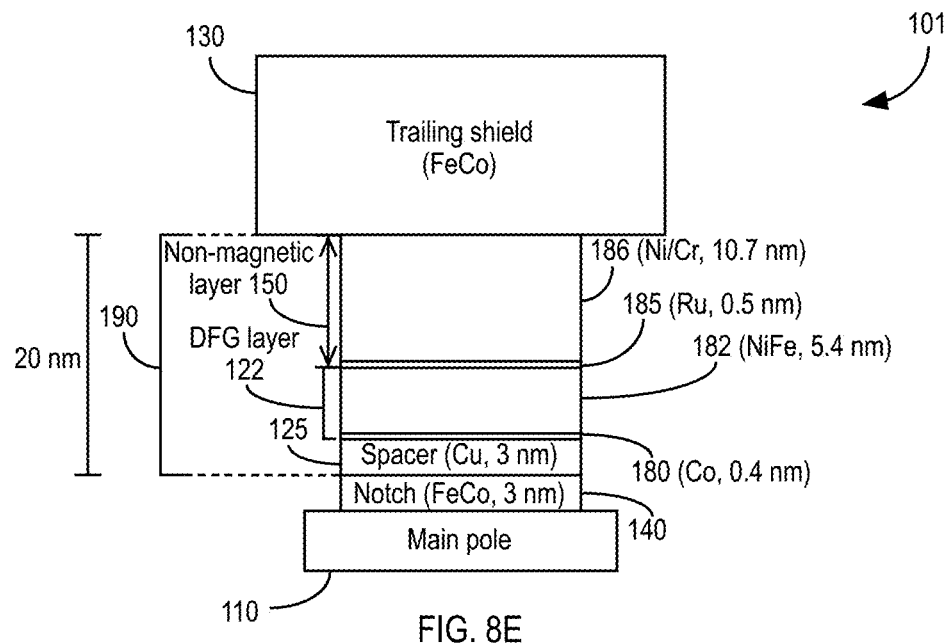
FIG. 8E is a view of the ABS of another exemplary MP-integrated writer in accordance with some embodiments.

FIG. 8E is a view of the ABS 105 of another exemplary MP-integrated writer 101 in accordance with some embodiments. Like the exemplary embodiments shown in FIGS. 8A through 8D, the exemplary writer 101 illustrated in FIG. 8E includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{95}Fe_5$. In the embodiment shown in FIG. 8E, the first layer 180, which abuts the spacer 125, is about 0.4 nm thick, and the second layer 182, which abuts the non-magnetic layer 150, is about 5.4 nm thick. Thus, the DFG layer 122 of the exemplary embodiment illustrated in FIG. 8E is approximately 5.8 nm thick.

The non-magnetic layer 150 comprises two layers, 185 and 186, in the exemplary embodiment of FIG. 8E and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 10.7 nm thick.

The trailing shield 130, which abuts the non-magnetic layer 150, comprises FeCo. For example, the trailing shield 130 may comprise $Fe_{70}Co_{30}$.

The effective write gap 190 of the exemplary embodiment illustrated in FIG. 8E, which comprises the spacer 125, the DFG layer 122, and the non-magnetic layer 150, is approximately 20 nm thick.

Figure 8F:
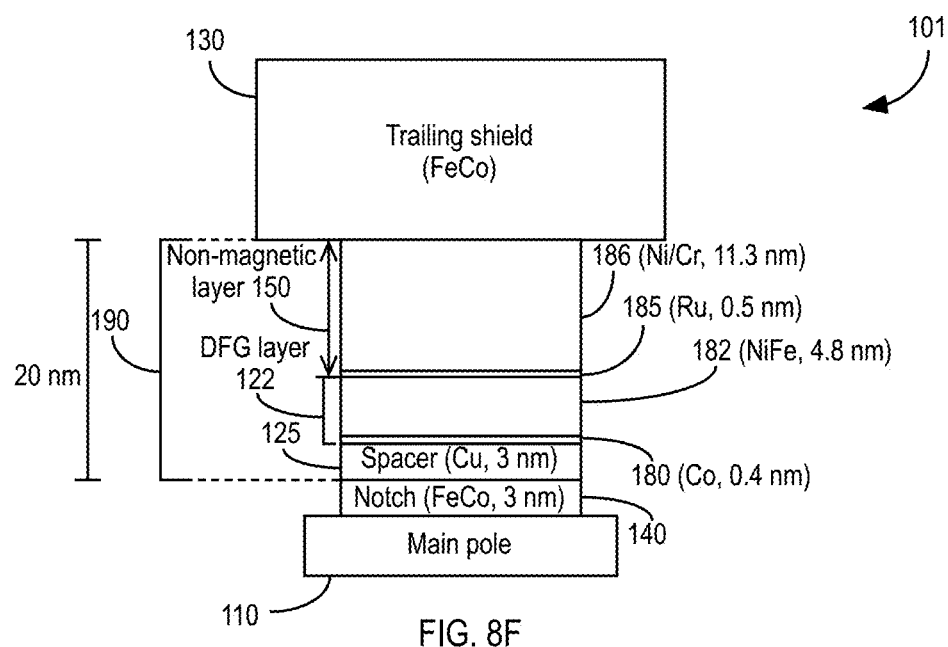
FIG. 8F is a view of the ABS of another exemplary MP-integrated writer in accordance with some embodiments.

FIG. 8F is a view of the ABS 105 of another exemplary MP-integrated writer 101 in accordance with some embodiments. Like the exemplary embodiments shown in FIGS. 8A through 8E, the exemplary writer 101 illustrated in FIG. 8F includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{90}Fe_{10}$. In the embodiment shown in FIG. 8F, the first layer 180, which abuts the spacer 125, is about 0.4 nm thick, and the second layer 182, which abuts the non-magnetic layer 150, is about 4.8 nm thick. Thus, the DFG layer 122 of the exemplary embodiment illustrated in FIG. 8F is approximately 5.2 nm thick.

The non-magnetic layer 150 comprises two layers, 185 and 186, in the exemplary embodiment of FIG. 8F and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 11.3 nm thick.

The trailing shield 130, which abuts the non-magnetic layer 150, comprises FeCo. For example, the trailing shield 130 may comprise $Fe_{70}Co_{30}$.

The effective write gap 190 of the exemplary embodiment illustrated in FIG. 8F, which comprises the spacer 125, the DFG layer 122, and the non-magnetic layer 150, is approximately 20 nm thick.

Figure 8G:
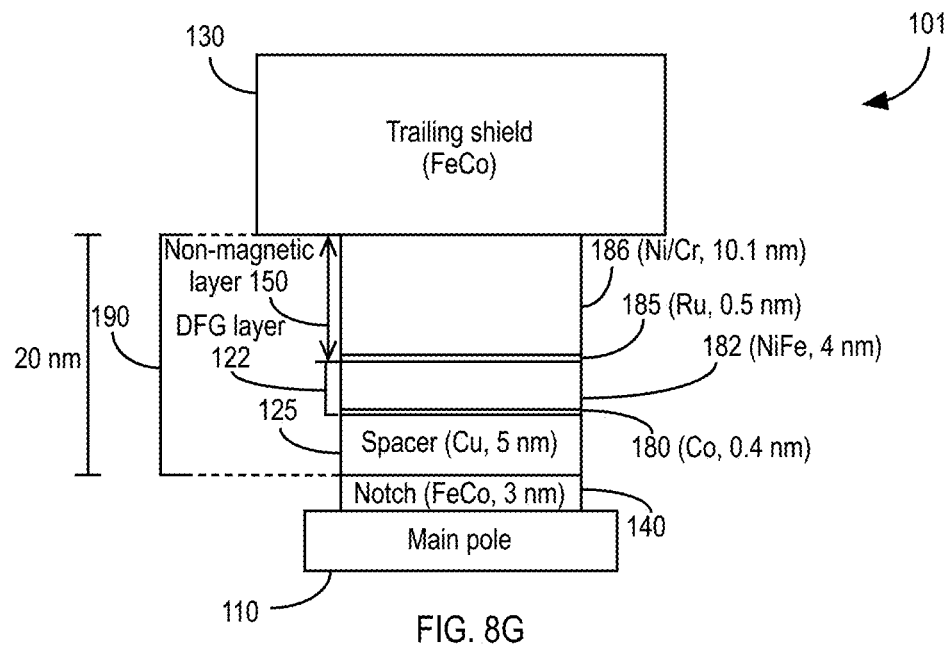
FIG. 8G is a view of the ABS of another exemplary MP-integrated writer in accordance with some embodiments.

FIG. 8G is a view of the ABS 105 of another exemplary MP-integrated writer 101 in accordance with some embodiments. Like the exemplary embodiments shown in FIGS. 8A through 8F, the exemplary writer 101 illustrated in FIG. 8G includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 3 nm thick. In some embodiments, the magnetic notch 140 comprises $Fe_{70}Co_{30}$.

The spacer 125, which is disposed between and adjacent to the magnetic notch 140 and the DFG layer 122, comprises copper, but in the exemplary embodiment illustrated in FIG. 8G, the spacer 125 is thicker than in the embodiments illustrated in FIGS. 8A through 8F. In the exemplary embodiment illustrated in FIG. 8G, the spacer 125 is approximately 5 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8G, the first layer 180, which abuts the spacer 125, is about 0.4 nm thick, and the second layer 182, which abuts the non-magnetic layer 150, is about 4 nm thick. Thus, the DFG layer 122 of the exemplary embodiment illustrated in FIG. 8G is approximately 4.4 nm thick.

The non-magnetic layer 150 comprises two layers, 185 and 186, in the exemplary embodiment of FIG. 8G and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 10.1 nm thick.

The trailing shield 130, which abuts the non-magnetic layer 150, comprises FeCo. For example, the trailing shield 130 may comprise $Fe_{70}Co_{30}$.

The effective write gap 190 of the exemplary embodiment illustrated in FIG. 8G, which comprises the spacer 125, the DFG layer 122, and the non-magnetic layer 150, is approximately 20 nm thick.

Figure 8H:
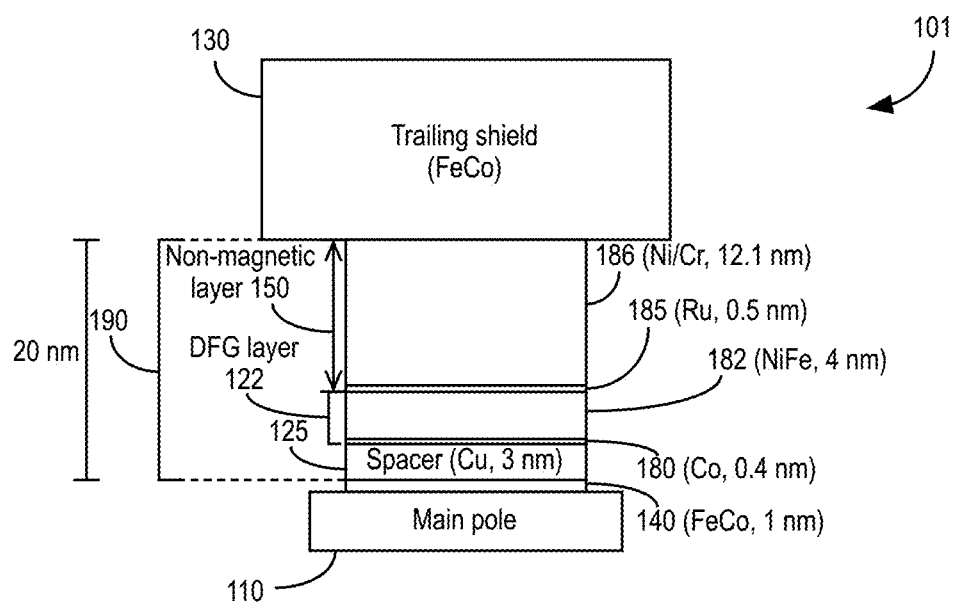
FIG. 8H is a view of the ABS of another exemplary MP-integrated writer in accordance with some embodiments.

FIG. 8H is a view of the ABS 105 of another exemplary MP-integrated writer 101 in accordance with some embodiments. Like the exemplary embodiments shown in FIGS. 8A through 8G, the exemplary writer 101 illustrated in FIG. 8H includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 1 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8H, the first layer 180, which abuts the spacer 125, is about 0.4 nm thick, and the second layer 182, which abuts the non-magnetic layer 150, is about 4 nm thick. Thus, the DFG layer 122 of the exemplary embodiment illustrated in FIG. 8H is approximately 4.4 nm thick.

The non-magnetic layer 150 comprises two layers, 185 and 186, in the exemplary embodiment of FIG. 8H and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 12.1 nm thick.

The trailing shield 130, which abuts the non-magnetic layer 150, comprises FeCo. For example, the trailing shield 130 may comprise $Fe_{70}Co_{30}$.

The effective write gap 190 of the exemplary embodiment illustrated in FIG. 8H, which comprises the spacer 125, the DFG layer 122, and the non-magnetic layer 150, is approximately 20 nm thick.

Figure 8I:
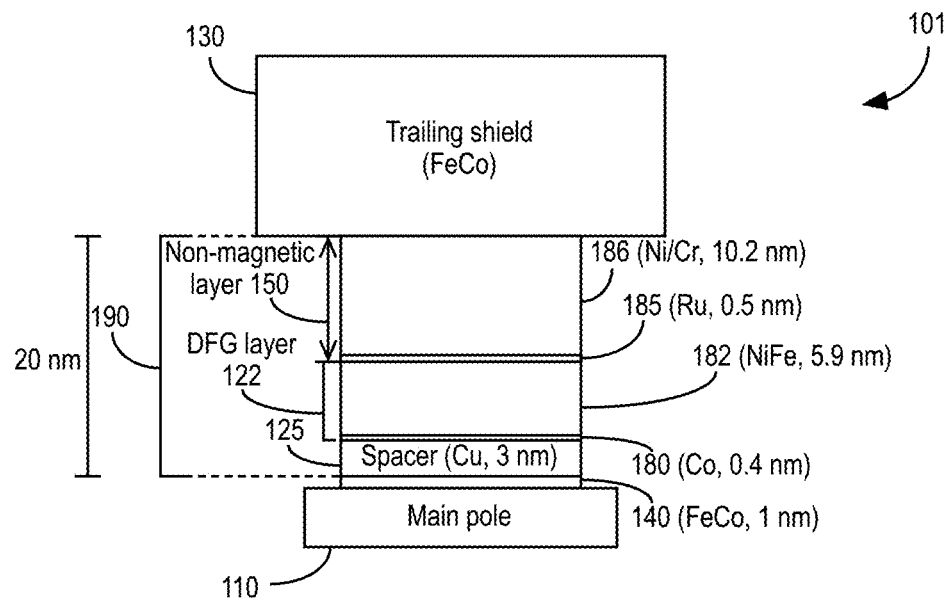
FIG. 8I is a view of the ABS of another exemplary MP-integrated writer in accordance with some embodiments.

FIG. 8I is a view of the ABS 105 of another exemplary MP-integrated writer 101 in accordance with some embodiments. Like the exemplary embodiments shown in FIGS. 8A through 8H, the exemplary writer 101 illustrated in FIG. 8H includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 1 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8I, the first layer 180, which abuts the spacer 125, is about 0.4 nm thick, and the second layer 182, which abuts the non-magnetic layer 150, is about 5.9 nm thick. Thus, the DFG layer 122 of the exemplary embodiment illustrated in FIG. 8I is approximately 6.3 nm thick.

The non-magnetic layer 150 comprises two layers, 185 and 186, in the exemplary embodiment of FIG. 8I and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 10.2 nm thick.

The trailing shield 130, which abuts the non-magnetic layer 150, comprises FeCo. For example, the trailing shield 130 may comprise $Fe_{70}Co_{30}$.

The effective write gap 190 of the exemplary embodiment illustrated in FIG. 8I, which comprises the spacer 125, the DFG layer 122, and the non-magnetic layer 150, is approximately 20 nm thick.

Figure 8J:
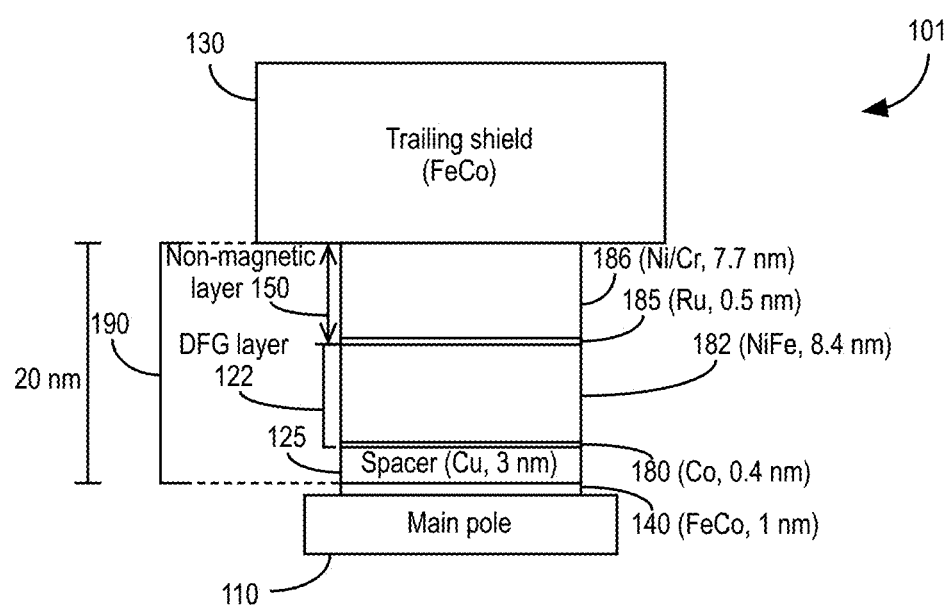
FIG. 8J is a view of the ABS of another exemplary MP-integrated writer in accordance with some embodiments.

FIG. 8J is a view of the ABS 105 of another exemplary MP-integrated writer 101 in accordance with some embodiments. Like the exemplary embodiments shown in FIGS. 8A through 8I, the exemplary writer 101 illustrated in FIG. 8J includes a main pole 110, the optional magnetic notch 140, a spacer 125, a DFG layer 122, a non-magnetic layer 150, and a trailing shield 130.

The magnetic notch 140, which is disposed between and adjacent to the main pole 110 and the spacer 125, comprises FeCo and is approximately 1 nm thick. In some embodiments, the magnetic notch 140 comprises $Fe_{70}Co_{30}$.

The spacer 125, which is disposed between and adjacent to the magnetic notch 140 and the DFG layer 122, comprises copper and is approximately 3 nm thick.

The DFG layer 122, which is disposed between and adjacent to the spacer 125 and the non-magnetic layer 150, comprises a first layer 180 comprising Co and a second layer 182 comprising NiFe. For example, the second layer 182 may comprise $Ni_{80}Fe_{20}$. In the embodiment shown in FIG. 8J, the first layer 180, which abuts the spacer 125, is about 0.4 nm thick, and the second layer 182, which abuts the non-magnetic layer 150, is about 8.4 nm thick. Thus, the DFG layer 122 of the exemplary embodiment illustrated in FIG. 8J is approximately 8.8 nm thick.

The non-magnetic layer 150 comprises two layers, 185 and 186, in the exemplary embodiment of FIG. 8J and is disposed between and adjacent to the DFG layer 122 and the trailing shield 130. The first layer 185 comprises ruthenium and is about 0.5 nm thick. The second layer 186 comprises nickel or chromium (or both nickel and chromium) and is approximately 7.7 nm thick.

The trailing shield 130, which abuts the non-magnetic layer 150, comprises FeCo. For example, the trailing shield 130 may comprise $Fe_{70}Co_{30}$.

The effective write gap 190 of the exemplary embodiment illustrated in FIG. 8J, which comprises the spacer 125, the DFG layer 122, and the non-magnetic layer 150, is approximately 20 nm thick.

Figure 9A:
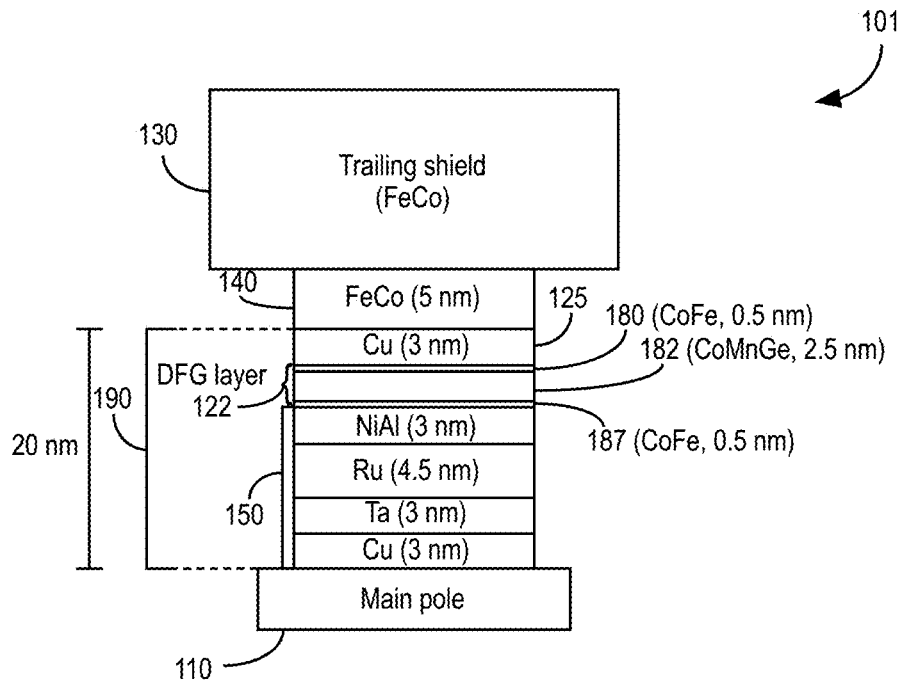
FIG. 9A is a view of the ABS of an exemplary TS-integrated writer in accordance with some embodiments.

FIG. 9A is a view of the ABS 105 of an exemplary TS-integrated writer 101 in accordance with some embodiments. Like the TS-integrated writer 101 shown in FIG. 6B, the exemplary writer 101 illustrated in FIG. 9A includes a main pole 110, a non-magnetic layer 150, a DFG layer 122, a spacer 125, the optional magnetic notch 140, and a trailing shield 130.

The non-magnetic layer 150 is disposed between and adjacent to the main pole 110 and the DFG layer 122. In the embodiment illustrated in FIG. 9A, the non-magnetic layer 150 includes four sublayers: (1) a copper sublayer that is approximately 3 nm thick, (2) a tantalum sublayer that is approximately 3 nm thick, (3) a ruthenium sublayer that is approximately 4.5 nm thick, and (4) a NiAl sublayer that is approximately 3 nm thick. Thus, the non-magnetic layer 150 is approximately 13.5 nm thick.

The DFG layer 122, which is disposed between and adjacent to the non-magnetic layer 150 and the spacer 125, comprises a first layer 180 comprising CoFe, a second layer 182 comprising CoMnGe, and a third layer 187 comprising CoFe. For example, the first layer 180 may comprise $Co_{50}Fe_{50}$, the second layer 182 may comprise $Co_{53}Mn_{23}Ge_{24}$, and the third layer may comprise $Co_{50}Fe_{50}$. In the embodiment shown in FIG. 9A, the first layer 180, which abuts the spacer 125, is about 0.5 nm thick, the second layer 182 is about 2.5 nm thick, and the third layer 187, which abuts the non-magnetic layer 150, is about 0.5 nm thick. Therefore, the DFG layer 122 of the exemplary embodiment illustrated in FIG. 9A is approximately 3.5 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9A, the trailing shield 130 comprises FeCo. For example, the trailing shield 130 may comprise $Fe_{70}Co_{30}$.

The effective write gap 190 of the exemplary embodiment illustrated in FIG. 9A, which comprises the spacer 125, the DFG layer 122, and the non-magnetic layer 150, is approximately 20 nm thick.

Figure 9B:
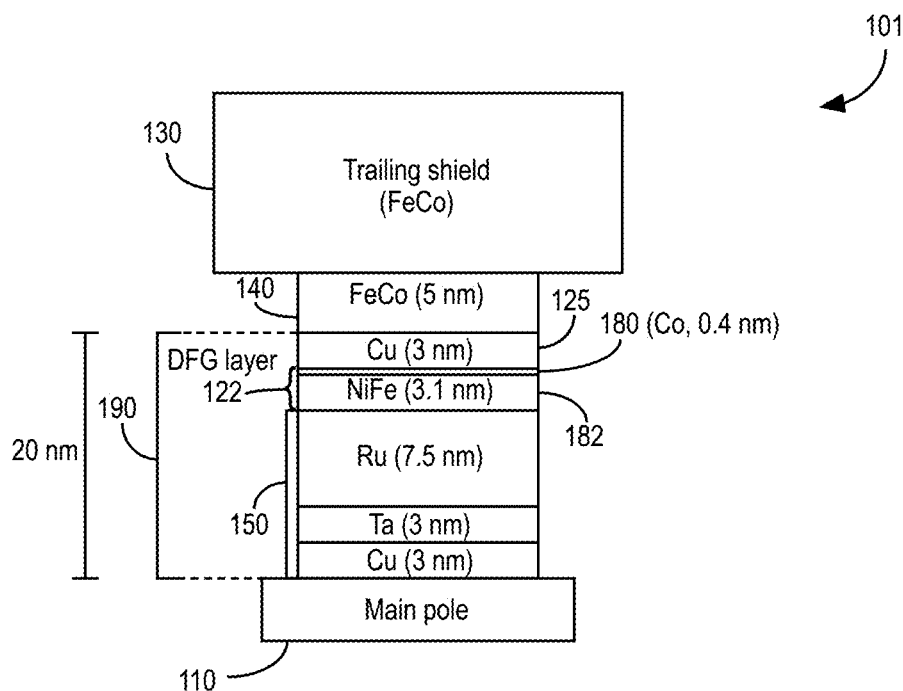
FIG. 9B is a view of the ABS of another exemplary TS-integrated writer in accordance with some embodiments.

FIG. 9B is a view of the ABS 105 of an exemplary TS-integrated writer 101 in accordance with some embodiments. Like the TS-integrated writer 101 shown in FIG. 9A, the exemplary writer 101 illustrated in FIG. 9B includes a main pole 110, a non-magnetic layer 150, a DFG layer 122, a spacer 125, the optional magnetic notch 140, and a trailing shield 130.

The non-magnetic layer 150 is disposed between and adjacent to the main pole 110 and the DFG layer 122. In the embodiment illustrated in FIG. 9B, the non-magnetic layer 150 includes three sublayers: (1) a copper sublayer that is approximately 3 nm thick, (2) a tantalum sublayer that is approximately 3 nm thick, and (3) a ruthenium sublayer that is approximately 7.5 nm thick. Thus, the non-magnetic layer 150 is approximately 13.5 nm thick.

The DFG layer 122, which is disposed between and adjacent to the non-magnetic layer 150 and the spacer 125, comprises a first layer 180 comprising Co and a second layer 182 comprising NiFe. In some embodiments, the second layer 182 may comprise $Ni_{80}Fe_{20}$. In the embodiment shown in FIG. 9B, the first layer 180, which abuts the spacer 125, is about 0.4 nm thick, and the second layer 182, which abuts the non-magnetic layer 150, is about 3.1 nm thick. Therefore, the DFG layer 122 of the exemplary embodiment illustrated in FIG. 9B is approximately 3.5 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9B, the trailing shield 130 comprises FeCo. For example, the trailing shield 130 may comprise $Fe_{70}Co_{30}$.

The effective write gap 190 of the exemplary embodiment illustrated in FIG. 9B, which comprises the spacer 125, the DFG layer 122, and the non-magnetic layer 150, is approximately 20 nm thick.

Figure 9C:
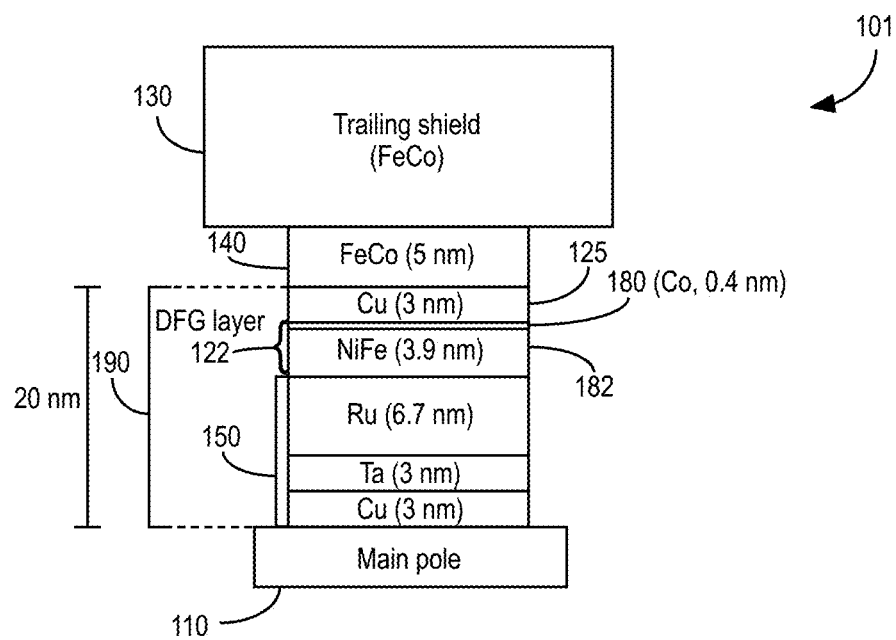
FIG. 9C is a view of the ABS of another exemplary TS-integrated writer in accordance with some embodiments.

FIG. 9C is a view of the ABS 105 of an exemplary TS-integrated writer 101 in accordance with some embodiments. Like the TS-integrated writers 101 shown in FIGS. 9A and 9B, the exemplary writer 101 illustrated in FIG. 9C includes a main pole 110, a non-magnetic layer 150, a DFG layer 122, a spacer 125, the optional magnetic notch 140, and a trailing shield 130.

The non-magnetic layer 150 is disposed between and adjacent to the main pole 110 and the DFG layer 122. In the embodiment illustrated in FIG. 9C, the non-magnetic layer 150 includes three sublayers: (1) a copper sublayer that is approximately 3 nm thick, (2) a tantalum sublayer that is approximately 3 nm thick, and (3) a ruthenium sublayer that is approximately 6.7 nm thick. Thus, the non-magnetic layer 150 is approximately 12.7 nm thick.

The DFG layer 122, which is disposed between and adjacent to the non-magnetic layer 150 and the spacer 125, comprises a first layer 180 comprising Co and a second layer 182 comprising NiFe. In some embodiments, the second layer 182 comprises $Ni_{80}Fe_{20}$. In the embodiment shown in FIG. 9C, the first layer 180, which abuts the spacer 125, is about 0.4 nm thick, and the second layer 182, which abuts the non-magnetic layer 150, is about 3.9 nm thick. Therefore, the DFG layer 122 of the exemplary embodiment illustrated in FIG. 9C is approximately 4.3 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9C, the trailing shield 130 comprises FeCo. For example, the trailing shield 130 may comprise $Fe_{70}Co_{30}$.

The effective write gap 190 of the exemplary embodiment illustrated in FIG. 9C, which comprises the spacer 125, the DFG layer 122, and the non-magnetic layer 150, is approximately 20 nm thick.

Figure 9D:
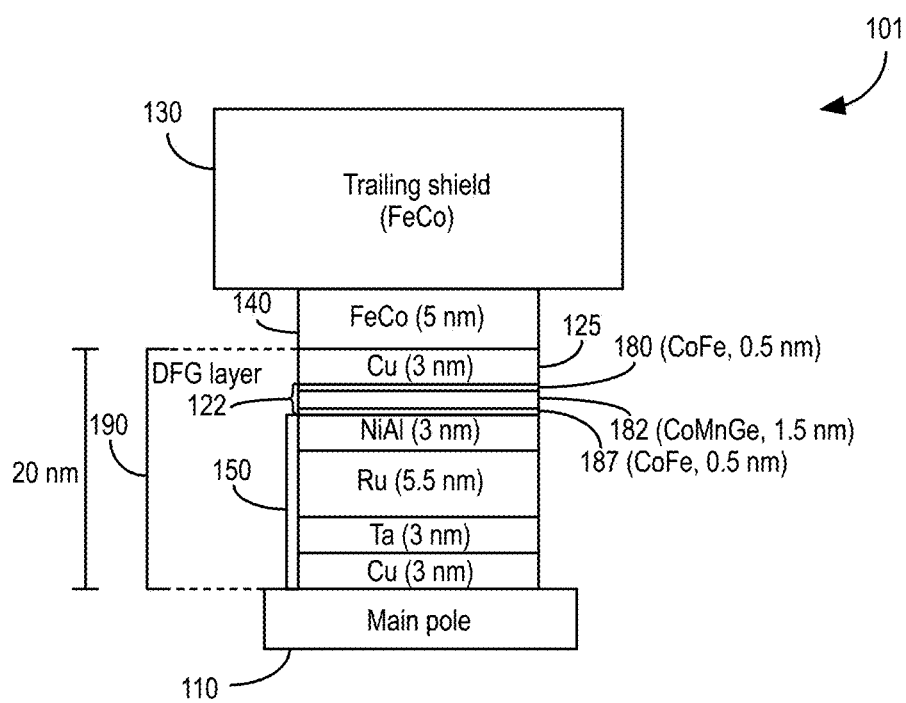
FIG. 9D is a view of the ABS of another exemplary TS-integrated writer in accordance with some embodiments.

FIG. 9D is a view of the ABS 105 of an exemplary TS-integrated writer 101 in accordance with some embodiments. Like the TS-integrated writers 101 shown in FIGS. 9A through 9C, the exemplary writer 101 illustrated in FIG. 9D includes a main pole 110, a non-magnetic layer 150, a DFG layer 122, a spacer 125, the optional magnetic notch 140, and a trailing shield 130.

The non-magnetic layer 150 is disposed between and adjacent to the main pole 110 and the DFG layer 122. In the embodiment illustrated in FIG. 9D, the non-magnetic layer 150 includes four sublayers: (1) a copper sublayer that is approximately 3 nm thick, (2) a tantalum sublayer that is approximately 3 nm thick, (3) a ruthenium sublayer that is approximately 5.5 nm thick, and (4) a NiAl sublayer that is approximately 3 nm thick. Thus, the non-magnetic layer 150 is approximately 14.5 nm thick.

The DFG layer 122, which is disposed between and adjacent to the spacer 125 and the non-magnetic layer 150, comprises a first layer 180 comprising CoFe, a second layer 182 comprising CoMnGe, and a third layer 187 comprising CoFe. For example, the first layer 180 may comprise $Co_{50}Fe_{50}$, the second layer 182 may comprise $Co_{53}Mn_{23}Ge_{24}$, and the third layer 187 may comprise $Co_{50}Fe_{50}$. In the embodiment shown in FIG. 9D, the first layer 180, which abuts the spacer 125, is about 0.5 nm thick; the second layer 182 is about 1.5 nm thick; and the third layer 187, which abuts the non-magnetic layer 150, is about 0.5 nm thick. Therefore, the DFG layer 122 of the exemplary embodiment illustrated in FIG. 9D is approximately 2.5 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9D, the trailing shield 130 comprises FeCo. For example, the trailing shield 130 may comprise $Fe_{70}Co_{30}$.

The effective write gap 190 of the exemplary embodiment illustrated in FIG. 9D, which comprises the spacer 125, the DFG layer 122, and the non-magnetic layer 150, is approximately 20 nm thick.

Figure 9E:
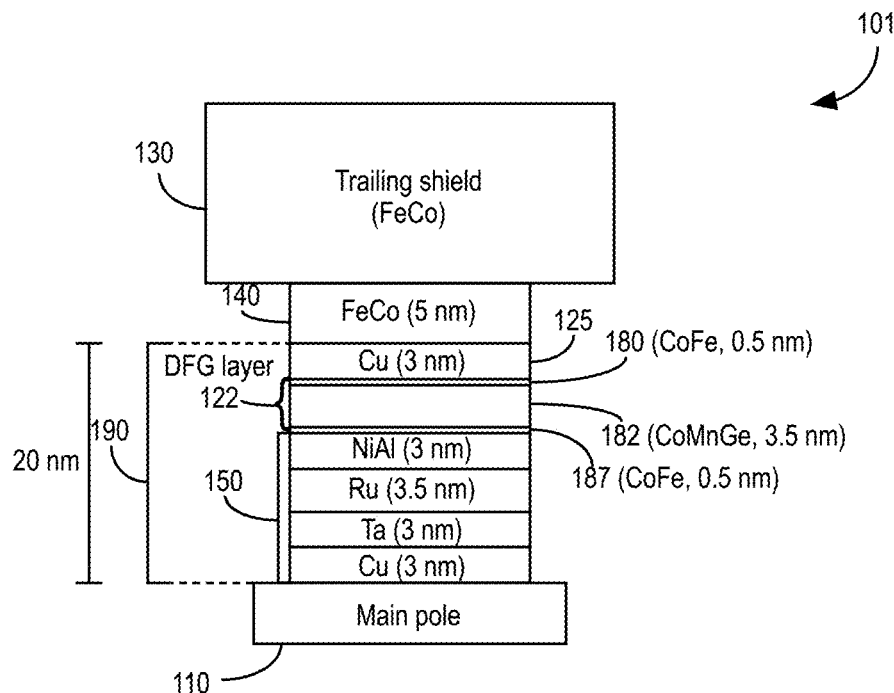
FIG. 9E is a view of the ABS of another exemplary TS-integrated writer in accordance with some embodiments.

FIG. 9E is a view of the ABS 105 of an exemplary TS-integrated writer 101 in accordance with some embodiments. Like the TS-integrated writers 101 shown in FIGS. 9A through 9D, the exemplary writer 101 illustrated in FIG. 9E includes a main pole 110, a non-magnetic layer 150, a DFG layer 122, a spacer 125, the optional magnetic notch 140, and a trailing shield 130.

The non-magnetic layer 150 is disposed between and adjacent to the main pole 110 and the DFG layer. In the embodiment illustrated in FIG. 9E, the non-magnetic layer 150 includes four sublayers: (1) a copper sublayer that is approximately 3 nm thick, (2) a tantalum sublayer that is approximately 3 nm thick, (3) a ruthenium sublayer that is approximately 3.5 nm thick, and (4) a NiAl sublayer that is approximately 3 nm thick. Thus, the non-magnetic layer 150 is approximately 12.5 nm thick.

The DFG layer 122, which is disposed between and adjacent to the spacer 125 and the non-magnetic layer 150, comprises a first layer 180 comprising CoFe, a second layer 182 comprising CoMnGe, and a third layer 187 comprising CoFe. For example, the first layer 180 may comprise $Co_{50}Fe_{50}$, the second layer 182 may comprise $Co_{53}Mn_{23}Ge_{24}$, and the third layer 187 may comprise $Co_{50}Fe_{50}$. In the embodiment shown in FIG. 9E, the first layer 180, which abuts the spacer 125, is about 0.5 nm thick; the second layer 182 is about 3.5 nm thick; and the third layer 187, which abuts the non-magnetic layer 150, is about 0.5 nm thick. Therefore, the DFG layer 122 of the exemplary embodiment illustrated in FIG. 9E is approximately 4.5 nm thick.

The spacer 125, which is disposed between and adjacent to the magnetic notch 140 and the DFG layer 122, comprises copper and is approximately 3 nm thick.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9E, the trailing shield 130 comprises FeCo. For example, the trailing shield 130 may comprise $Fe_{70}Co_{30}$.

The effective write gap 190 of the exemplary embodiment illustrated in FIG. 9E, which comprises the spacer 125, the DFG layer 122, and the non-magnetic layer 150, is approximately 20 nm thick.

Figure 9F:
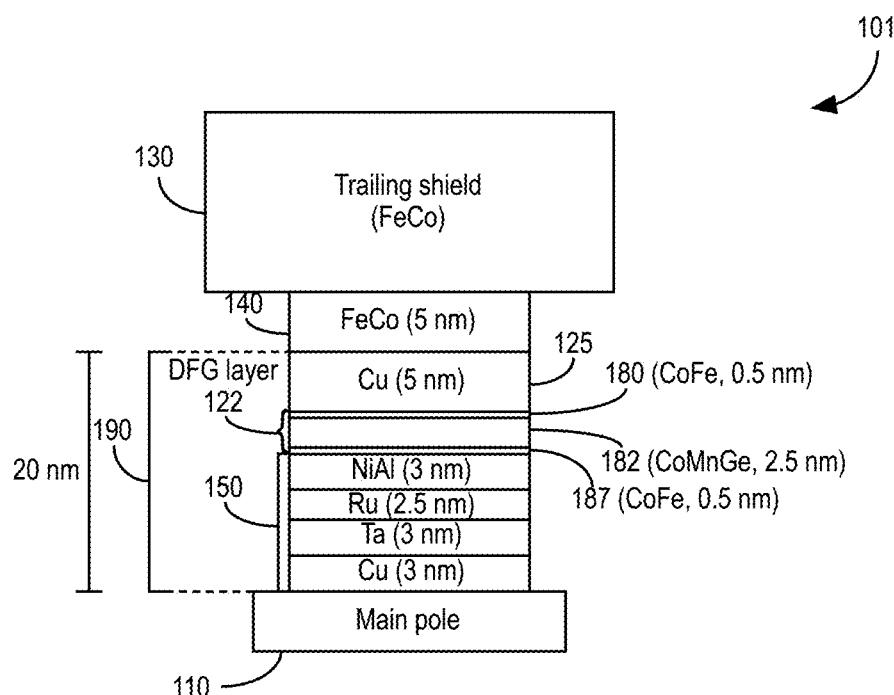
FIG. 9F is a view of the ABS of another exemplary TS-integrated writer in accordance with some embodiments.

FIG. 9F is a view of the ABS 105 of an exemplary TS-integrated writer 101 in accordance with some embodiments. Like the TS-integrated writers 101 shown in FIGS. 9A through 9E, the exemplary writer 101 illustrated in FIG. 9F includes a main pole 110, a non-magnetic layer 150, a DFG layer 122, a spacer 125, the optional magnetic notch 140, and a trailing shield 130.

The non-magnetic layer 150 is disposed between and adjacent to the main pole 110 and the DFG layer 122. In the embodiment illustrated in FIG. 9F, the non-magnetic layer 150 includes four sublayers: (1) a copper sublayer that is approximately 3 nm thick, (2) a tantalum sublayer that is approximately 3 nm thick, (3) a ruthenium sublayer that is approximately 2.5 nm thick, and (4) a NiAl sublayer that is approximately 3 nm thick. Thus, the non-magnetic layer 150 is approximately 11.5 nm thick.

The DFG layer 122, which is disposed between and adjacent to the non-magnetic layer 150 and the spacer 125, comprises a first layer 180 comprising CoFe, a second layer 182 comprising CoMnGe, and a third layer comprising CoFe. For example, the first layer 180 may comprise $Co_{50}Fe_{50}$, the second layer 182 may comprise $Co_{53}Mn_{23}Ge_{24}$, and the third layer 187 may comprise $Co_{50}Fe_{50}$. In the embodiment shown in FIG. 9F, the first layer 180, which abuts the spacer 125, is about 0.5 nm thick; the second layer 182 is about 2.5 nm thick; and the third layer 187, which abuts the non-magnetic layer 150, is about 0.5 nm thick. Therefore, the DFG layer 122 of the exemplary embodiment illustrated in FIG. 9F is approximately 3.5 nm thick.

The spacer 125, which is disposed between and adjacent to the magnetic notch 140 and the DFG layer 122, comprises copper and is approximately 5 nm thick in the exemplary embodiment illustrated in FIG. 9F.

The magnetic notch 140, which is disposed between and adjacent to the trailing shield 130 and the spacer 125, comprises FeCo and is approximately 5 nm thick. In some embodiments, the magnetic notch 140 comprises $Fe_{70}Co_{30}$.

The trailing shield 130 abuts the magnetic notch 140. In the exemplary embodiment illustrated in FIG. 9F, the trailing shield 130 comprises FeCo. For example, the trailing shield 130 may comprise $Fe_{70}Co_{30}$.

The effective write gap 190 of the exemplary embodiment illustrated in FIG. 9F, which comprises the spacer 125, the DFG layer 122, and the non-magnetic layer 150, is approximately 20 nm thick.

It is to be understood that although FIGS. 8A through 8J and FIGS. 9A through 9F illustrate various layers in contact with each other (e.g., the spacer 125 is illustrated as abutting the optional magnetic notch 140, the DFG layer 122 is shown abutting the non-magnetic layer 150, etc.), these embodiments are simply exemplary. Additional layers may be included between the main pole 110 and the trailing shield 130 without departing from the spirit of this disclosure.

Figure 10:
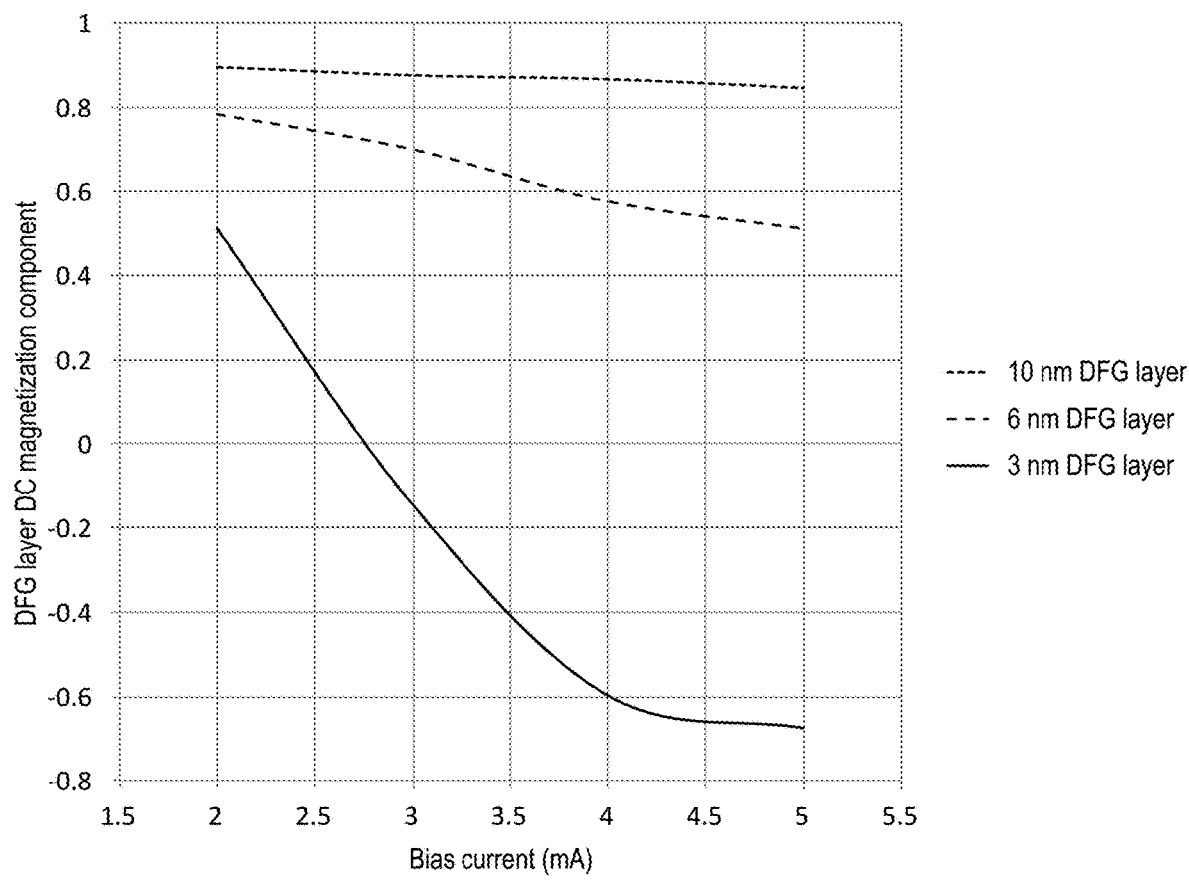
FIG. 10 is a plot of the DFG layer DC magnetization component as a function of the applied bias current.

FIG. 10 is a plot of the DC component of the DFG layer magnetization 124 of the writer 101 as a function of the applied bias current. Specifically, FIG. 10 illustrates the impact of the thickness of the DFG layer 122 on the performance of the writer 101. The plots in FIG. 10 indicate that if the DFG layer 122 is too thick, e.g., in the particular embodiment used to generate FIG. 10, either 10 nm or 6 nm, the DFG layer DC magnetization component that results from the application of a bias current up to about 5 mA is positive and aligns with the gap field, and therefore the DFG layer DC field component 123 detracts from the write field 115 in the media. But when the DFG layer 122 is thin enough, e.g., 3 nm thick in the particular embodiment used to generate FIG. 10, the DFG layer 122 achieves a precession angle approaching −45 degrees when the bias current is in the range of about 4.5-5 mA. Thus, the 3 nm DFG layer 122 produces a negative DFG layer DC magnetization component, and hence a DFG layer DC field component 123, that reinforces, rather than degrades, the write field 115 in the media. The plots of FIG. 10 indicate that there is a limit to how thick the DFG layer 122 may be to provide the benefits described herein, because bias current is generally limited by the reliability of the head. The precise thickness limit depends on many material parameters, and changes for different components, but the primary point of FIG. 10 is that there is a limit to how thick the DFG layer 122 can be.

In addition to the DFG layer 122 thickness, the magnetic moment of the DFG layer 122 also affects the performance of the writer 101. The magnitude of the DFG layer DC field component 123 is proportional to the magnetic moment of the DFG layer 122. Larger DFG layer 122 magnetization and thicker DFG layers 122 result in larger magnetic fields, but they may decrease the performance of the DFG layer 122 in terms of fast, stable, single-domain oscillations with DC components opposing the gap field, especially in the case of lower bias currents. Damping may also be important. The embodiments illustrated in FIGS. 9A through 9F have an advantage in damping reduction because of the conventional seed layer used in the design. Polarization likely plays secondary role. Thus, optimization of the thickness and magnetic moment of the DFG layer 122 corresponding to available bias current in heads may be desirable to optimize performance of a writer 101. FIGS. 8A through 8J and FIGS. 9A through 9F provide several exemplary embodiments of writers 101 with DFG layers 122 having different thicknesses and compositions for optimizing the damping factor, available bias current, saturation magnetization of the DFG layer 122, and the required bias current to flip the DC magnetization component of the DFG layer 122 to oppose the gap field Hgap 170. For example, FIG. 8J has a thick DFG layer 122; in the case that the bias current is high enough to flip the DC component of the DFG layer magnetization 124, a large DC field component is obtained. In contrast, FIG. 9B or 9D has a thinner DFG layer 122, requiring a lower bias current to flip the DC component of the DFG layer magnetization 124, which is better for reliability. The expected DFG layer DC field component 123 from a thin layer is limited, however.

Micromagnetic modeling of an integrated writer and DFG layer 122 indicates that a DFG layer 122 having a thickness of 3 nm and a magnetic moment of 1.3 Tesla achieves an approximately −45 degree precession angle with slightly noisy oscillations, whereas a DFG layer 122 having a thickness of 3 nm and a magnetic moment of 0.6 Tesla achieves an approximately −90 degree precession angle with nearly ideal performance. Micromagnetic modeling also indicates that DFG layers 122 having a thickness of 6 nm and a magnetic moment of 1.3 Tesla do not precess to negative angles, and thus these DFG layers 122 are less likely to provide the desirable positive DC effect.

Both experiments and theoretical modeling indicate that a writer 101 with a 3 nm DFG layer 122 having a magnetic moment of 1.3 Tesla provides a gain in areal density capacity of approximately 5% relative to a conventional PMR writer. This gain is a result of smaller transition jitter (due to larger field gradient) and larger low-frequency signal-to-noise ratio (LFSNR) due to larger write field magnitude.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used herein, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings. Moreover, as explained above, certain dimensions, such as thicknesses of the DFG layer 122, spacer 125, non-magnetic layer 150, and optional magnetic notch 140, are given in the direction that is perpendicular to gap surfaces of the main pole 110 and trailing shield 130. If the main pole 110 and trailing shield 130 gap surfaces are not perpendicular to the ABS, but instead are slanted or tapered at some angle θ, then the thicknesses of these layers, and of the effective write gap 190, along the ABS 105 will be larger by a factor of $1/\cos(\theta)$ than the thickness in the direction perpendicular to the gap surfaces of the main pole 110 and the trailing shield 130.

Moreover, certain exemplary materials have been described herein as suitable for the DFG layer 122, spacer 125, non-magnetic layer 150, and optional magnetic notch 140. It is to be understood that other suitable materials (e.g., magnetic or non-magnetic) may be used instead or in addition.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A magnetic head having an air-bearing surface (ABS), the magnetic head comprising:
    a magnetic pole;
    a first shield separated from the magnetic pole at the ABS;
    a magnetic layer disposed between the magnetic pole and the first shield at the ABS, wherein the magnetic layer comprises at least one of iron, cobalt, or nickel;
    a first non-magnetic layer disposed between the magnetic pole and the magnetic layer at the ABS; and
    a second non-magnetic layer disposed between the magnetic layer and the first shield at the ABS,
    wherein the magnetic layer is the only magnetic layer at the ABS that is between the magnetic pole and the first shield and that is not adjacent to the magnetic pole or the first shield.

2. The magnetic head recited in claim 1, wherein at least one of the first non-magnetic layer or the second non-magnetic layer comprises nickel, chromium, aluminum, ruthenium, tantalum, or copper.

3. The magnetic head recited in claim 1, wherein at least one of the first non-magnetic layer or the second non-magnetic layer comprises a nickel-aluminum alloy or a nickel-chromium alloy.

4. The magnetic head recited in claim 1, wherein a current is conductable in a direction from the first non-magnetic layer toward the second non-magnetic layer via the magnetic layer.

5. The magnetic head recited in claim 1, wherein a current is conductable in a direction from the second non-magnetic layer toward the first non-magnetic layer via the magnetic layer.

6. The magnetic head recited in claim 1, wherein the magnetic pole is a main pole, and the first shield is a trailing shield.

7. The magnetic head recited in claim 1, wherein at least one of the first non-magnetic layer or the second non-magnetic layer comprises copper, silver, gold, an alloy comprising copper, an alloy comprising silver, or an alloy comprising gold.

8. The magnetic head recited in claim 1, wherein a thickness of the magnetic layer at the ABS in a downtrack direction is between about 3 nm and about 9 nm.

9. The magnetic head recited in claim 1, wherein a thickness of the first non-magnetic layer at the ABS in a downtrack direction is between about 3 nm and about 5 nm, and a thickness of the second non-magnetic layer at the ABS in the downtrack direction is between about 8 nm and about 19 nm.

10. The magnetic head recited in claim 1, wherein a thickness of the second non-magnetic layer at the ABS in downtrack direction is between about 3 nm and about 5 nm, and a thickness of the first non-magnetic layer at the ABS in the downtrack direction is between about 8 nm and about 19 nm.

11. The magnetic head recited in claim 1, wherein a magnetization of the magnetic layer has a component in a reverse direction of a magnetic field generated from the magnetic pole when a current is caused to flow between the first non-magnetic layer and the second non-magnetic layer.

12. The magnetic head recited in claim 1, wherein a magnetization of the magnetic layer has a component in a reverse direction of a magnetic field generated from the magnetic pole when a current is caused to flow between the second non-magnetic layer and the first non-magnetic layer.

13. The magnetic head recited in claim 1, wherein the magnetic layer comprises at least a first layer and a second layer.

14. The magnetic head recited in claim 13, wherein the first layer comprises at least one of cobalt, iron, or a cobalt-iron alloy, wherein a thickness of the first layer is between about 0.2 nm and about 1 nm, and wherein the second layer comprises an alloy of cobalt, a first element, and a second element, wherein the first element is manganese or iron, and the second element is germanium, aluminum, silicon, or gallium, and wherein a thickness of the second layer is between about 2 nm and about 8 nm.

15. The magnetic head recited in claim 14, wherein the magnetic layer further comprises a third layer comprising at least one of cobalt, iron, or a cobalt-iron alloy, wherein a thickness of the third layer is between about 0.2 nm and about 1 nm.

16. The magnetic head recited in claim 13, wherein the first layer comprises at least one of cobalt or a cobalt-iron alloy, wherein a thickness of the first layer is between about 0.2 nm and about 1 nm, and wherein the second layer comprises at least one of nickel, iron, or a nickel-iron alloy, wherein a thickness of the second layer is between about 2 nm and about 8 nm.

17. The magnetic head recited in claim 1, wherein a magnetic saturation flux density of the magnetic layer is between about 1 Tesla and about 1.5 Tesla.

18. The magnetic head recited in claim 1, further comprising a magnetic notch adjacent to the first shield or the magnetic pole, wherein the first shield and the magnetic notch or the magnetic pole and the magnetic notch are made of identical materials, wherein a thickness of the magnetic notch is between about 1 nm and about 10 nm.

19. The magnetic head recited in claim 1, further comprising a magnetic notch between the first shield and the second non-magnetic layer, or between the magnetic pole and the first non-magnetic layer, wherein the magnetic notch comprises at least one of cobalt or iron.

20. A data storage device, comprising:
the magnetic head recited in claim 1;
a magnetic recording medium; and
a circuit configured to apply a bias current to the magnetic head to cause the magnetic head to write to the magnetic recording medium.

* * * * *